(12) United States Patent
McBride et al.

(10) Patent No.: US 8,666,302 B2
(45) Date of Patent: Mar. 4, 2014

(54) SYSTEM AND METHOD FOR EDUCATION INCLUDING COMMUNITY-SOURCED DATA AND COMMUNITY INTERACTIONS

(76) Inventors: Matthew D. McBride, Orlando, FL (US); Rain Hughes, Winter Park, FL (US)

( * ) Notice: Subject to any disclaimer, the term of this patent is extended or adjusted under 35 U.S.C. 154(b) by 0 days.

(21) Appl. No.: 13/554,612

(22) Filed: Jul. 20, 2012

(65) Prior Publication Data

US 2012/0301861 A1     Nov. 29, 2012

Related U.S. Application Data

(63) Continuation of application No. 13/248,323, filed on Sep. 29, 2011.

(60) Provisional application No. 61/457,362, filed on Mar. 9, 2011.

(51) Int. Cl.
*G09B 7/00*        (2006.01)

(52) U.S. Cl.
USPC .......................................... 434/353; 434/323

(58) Field of Classification Search
USPC ......................................... 434/350, 118, 362
See application file for complete search history.

(56) References Cited

U.S. PATENT DOCUMENTS

| | | |
|---|---|---|
| 5,818,328 A | 10/1998 | Anderson et al. |
| 6,208,445 B1 | 3/2001 | Reime |
| 6,353,447 B1 | 3/2002 | Truluck et al. |
| 6,456,645 B1 | 9/2002 | Kurrat |
| 6,704,541 B1 * | 3/2004 | Ciarallo et al. ............... 434/362 |
| 6,790,045 B1 | 9/2004 | Drimmer |
| 7,698,360 B2 | 4/2010 | Rowley et al. |
| 2006/0106788 A1 * | 5/2006 | Forrest .............................. 707/4 |
| 2010/0129783 A1 | 5/2010 | Liang et al. |
| 2010/0159438 A1 * | 6/2010 | German et al. ............... 434/433 |
| 2010/0316985 A1 * | 12/2010 | Lloyd ........................... 434/353 |

\* cited by examiner

*Primary Examiner* — Kathleen Mosser
(74) *Attorney, Agent, or Firm* — Maier & Maier PLLC

(57) ABSTRACT

A system and method for education including community-sourced data and community interactions. The method can include registering a plurality of users in a database, presenting educational material to a user of the plurality of users, recording the performance of the user in regards to the educational material, collecting personal statistics regarding the performance of the user, compiling the personal statistics for the plurality of users to generate community statistics regarding the performance of the plurality of users, comparing the personal statistics of a user to the community statistics or to a subset thereof, collecting personal information from each user of the plurality of users, subdividing the plurality of users into a plurality of communities based on the personal information of each user, facilitating interactions between the users within a community of the plurality of communities, and generating a credibility score for each user within the community.

14 Claims, 22 Drawing Sheets

Section Progress Report

[ Dashboard ] [ Answers ] [ Notes ] [ Study Time ]

| Section | Correct | Wrong | Percentage | Test Weight |
|---|---|---|---|---|
| Individuals | | | | |
| Chapter 1: Work and Tax Payer Data | ✓3 | ●12 | 20% | 33% |
| Chapter 2: Income and Assets | ✓11 | ●34 | 24% | 33% |
| Chapter 3: Deductions and Credits | ✓5 | ●19 | 21% | 33% |
| Totals: Individuals | ✓19 | ●55 | 35% | 100% |
| Business | | | | |
| Chapter 1: Businesses | ✓3 | ●12 | 20% | 33% |
| Chapter 2: Business Financial Info | ✓11 | ●34 | 24% | 33% |
| Chapter 3: Specialized Returns | ✓5 | ●19 | 21% | 33% |
| Totals: Business | ✓19 | ●55 | 35% | 100% |

| Totals | | | |
|---|---|---|---|
| | ✓42 | ●118 | 23% |

Incorrect Answers Report — 318

[ Dashboard ] [ Progress ] [ Notes ] [ Study Time ]  Click ✚ to show the question and rationale or ✱ to hide

322

| Q# | Unit | Section | Subsection | Answer | Your Answer | Correct | Date |
|---|---|---|---|---|---|---|---|
| ✚ 1306 | Individuals | Section 2: Income and Assets | Income | D | A (0/1) | ◯ | 02/05/2011 |
| ✚ 1312 | Individuals | Section 2: Income and Assets | Income | C | A (0/1) | ◯ | 02/05/2011 |
| ✱ 1927 | Individuals | Section 3: Deductions and Credits | Retirement Deductions IRAs | D | A (0/1) | ◯ | 02/03/2011 |

Subject: Contribution limits and deductibility of contributions
FFA EA Book Reference: CH 6 Adjustments to Gross Income

324

Question:

326

[Question Text]

A [Choice A]
B [Choice B]
C [Choice C]
D [Choice D]

Rationale:

[Rationale Text]

Correct Answer: D

| ✚ 1344 | Business | Section 1: Businesses | Corporations in general | C | B (0/1) | ◯ | 12/28/2011 |
| ✚ 1228 | Individuals | Section 2: Income and Assets | Property real and personal | C | A (0/2) | ◯ | 11/16/2011 |

Notes Report — 318

| Dashboard | Progress | Notes | Study Time | Click ✚ to show the question and rationale or ✱ to hide

332

| Unit | Section | Subsection | Answer | Last Answer | Correct | Note Date |
|---|---|---|---|---|---|---|
| ✚ Individuals | Section 3: Deductions and Credits | Itemized Deductions | B | (0/1) | ◯ | 02/21/2011 |
| ✚ Individuals | Section 1: Preliminary Work and Taxpayer Data | Preliminary Work to Prepare Returns | A | (0/1) | ◯ | 02/21/2011 |
| ✱ Individuals | Section 1: Preliminary Work and Taxpayer Data | Preliminary Work to Prepare Returns | D | (0/1) | ◯ | 02/21/2011 |

334

Notes:

[Notes Text]

Question:

336

[Question Text]

A [Choice A]
B [Choice B]
C [Choice C]
D [Choice D]

Rationale:

[Rationale Text]

| ✚ Individuals | Section 4: Taxation and Advice | Taxation | C | (0/1) | ◯ | 02/21/2011 |
| ✚ Business | Section 1: Businesses | Corporations in General | B | (1/3) | ✓ | 02/21/2011 |
| ✚ Business | Section 1: Businesses | Preliminary Work to Prepare Returns | B | (1/3) | ✓ | 02/21/2011 |

*Fig. 3c*

Create a Custom Practice SEE Exam

Create an Exam using an Enrolled Agent Exam Practice Credit.

Please choose the exam you would like to create from the choices below...

You are about to create an Individuals Exam, do you want to proceed?

Exam Analysis

[Dashboard] [Answers] [Exam Time]

| Section | Correct | Wrong | Percentage | Community | TestWeight |
|---|---|---|---|---|---|
| Individuals | | | | | |
| Section 2: Income and Assets | 33 | 11 | 75% | 68% | 25% |
| Section 3: Deductions and Credits | 39 | 7 | 85% | 75% | 25% |
| Section 4: Taxation and Advice | 25 | 9 | 74% | 72% | 20% |
| Section 5: Specialized Returns for Individuals | 14 | 8 | 64% | 75% | 15% |
| Totals: Individuals | 132 | 41 | 76% | 100% | 100% |
| Businesses | | | | | |
| Section 1: Businesses | 48 | 23 | 68% | 67% | 45% |
| Section 2: Business Financial Information | 41 | 11 | 79% | 70% | 40% |
| Section 3: Specialized Returns and Tax Payers | 26 | 3 | 90% | 63% | 15% |
| Totals: Businesses | 115 | 37 | 76% | 100% | 100% |
| Representation, Practice & Procedures | | | | | |
| Section 1: Practices and Procedures | 28 | 16 | 64% | 84% | 33% |
| Section 2: Representation before the IRS | 26 | 8 | 76% | 85% | 25% |
| Section 3: Specific Types of Representation | 17 | 12 | 59% | 83% | 25% |
| Section 4: Completion of the Filing Process | 24 | 2 | 92% | 84% | 17% |
| Totals: Representation, Practice & Procedures | 95 | 38 | 71% | 100% | 100% |
| Totals | 342 | 116 | 75% | 75% | |

| Community (Click bar to display analysis) | Correct | Wrong | Percentage | TestWeight |
|---|---|---|---|---|
| Individuals | | | | |
| Section 2: Income and Assets | 22,826 | 10,478 | 68% | 25% |
| Section 3: Deductions and Credits | 24,629 | 8,022 | 75% | 25% |
| Section 4: Taxation and Advice | 18,723 | 7,336 | 72% | 20% |
| Section 5: Specialized Returns for Individuals | 14,741 | 4,017 | 75% | 15% |
| Totals: Individuals | 95,086 | 0 | 100% | 100% |
| Businesses | | | | |
| Section 1: Businesses | 28,179 | 8,765 | 67% | 45% |
| Section 2: Business Financial Information | 18,787 | 8,092 | 70% | 40% |
| Section 3: Specialized Returns and Tax Payers | 5,186 | 3,628 | 63% | 15% |
| Totals: Businesses | 45,148 | 0 | 100% | 100% |
| Totals | 137,021 | 67,308 | 75% | |

| Unit | Section | Subsection | Subject | Correct | Wrong | Percentage |
|---|---|---|---|---|---|---|
| Representation Practice and Procedures | Section 1: Practices and Procedures | Becoming an enrolled agent | Categories of individuals who may practice | 0 | 1 | 0% |
| Representation Practice and Procedures | Section 1: Practices and Procedures | Requirements for enrolled agents | Concept of due diligence for return accuracy | 0 | 1 | 0% |
| Business | Section 2: Business Financial Information | Business assets | Like kind exchange | 1 | 3 | 33% |
| Business | Section 2: Businesses | Partnerships | Partner's Dealings with Partnership | 1 | 3 | 33% |
| Business | Section 2: Businesses | Partnerships | Partnership income, expenses, distributions, and flow through | 0 | 3 | 0% |

*Fig. 5d*

Exam Answers Report

560

562 — Dashboard  Analysis  Exam Time

Click ✢ to show the question and rationale or ■ to hide
Click on a exam bar to see your answers for that test.

562 — Representation Exam [Click bar to display the answers]   Completed on [date] with a score of 0% including 0 ✓ 0 ● and 100 unanswered
562 — Businesses Exam [Click bar to display the answers]   Completed on [date] with a score of 0% including 0 ✓ 0 ● and 100 unanswered
562 — Individuals Exam [Click bar to display the answers]   Completed on [date] with a score of 0% including 0 ✓ 0 ● and 100 unanswered
Businesses Exam [Click bar to display the answers]   Completed on [date] with a score of 2% including 2 ✓ 5 ● and 93 unanswered

| Q# | Unit | Section | Subsection | Correct Answer | Your Answer | Result | Date |
|----|------|---------|------------|----------------|-------------|--------|------|
| 564 — ✢ 1 | | Businesses Section 1: Businesses | Corporations in general | D | ▶ A | ○ | 7/29/2010 |
| 564 — ■ 2 | | Businesses Section 2: Business Financial Information | Business assets | B | A | ○ | 7/29/2010 |

Subject: Like kind exchange
FFA EA Book Reference: CH 14 Partnerships

Question:
[Question Text]

566

A  [Choice A]
B  [Choice B]
C  [Choice C]
D  [Choice D]

Rationale:
[Rationale Text]

Correct Answer: B

| | | | | | | | |
|---|---|---|---|---|---|---|---|
| 564 — ✢ 3 | | Businesses Section 1: Businesses | Business entities | B | A | ○ | 7/29/2010 |
| ✢ 4 | | Businesses Section 3: Specialized Returns and Taxpayers | Farmers | A | A | ✓ | 7/29/2010 |
| ✢ 5 | | Businesses Section 1: Businesses | Partnerships | B | A | ○ | 7/29/2010 |

*Fig. 5e*

Exam Time Report

[Dashboard] [Analysis] [Answers]

Total Exam Time: 1d 7h 47m 31s
Total Exams: 22
Average Time per Question: 4m 5s

You have 3.5 hours to answer 100 questions. 2 minutes per question or less is good.

| Exam Date | Unit | Total Time | Time per Question | Correct | Wrong | Percentage |
|---|---|---|---|---|---|---|
| 08/08/2010 | RPP Exam | 4m 38s | 1m 33s | 0 ✓ | 3 ○ | 0% |
| 07/29/2010 | Individuals Exam | 0s | 0s | 0 ✓ | 0 ○ | 0% |
| 03/20/2010 | Businesses Exam | 3h 19m 29s | 4m 2s | 29 ✓ | 4 ○ | 88% |
| 03/20/2010 | RPP Exam | 3h 30m 2s | 6m 3s | 26 ✓ | 6 ○ | 81% |
| 03/19/2010 | Businesses Exam | 1h 47m 12s | 1m 55s | 31 ✓ | 24 ○ | 56% |
| 03/19/2010 | RPP Exam | 2h 52m 51s | 1m 43s | 69 ✓ | 31 ○ | 69% |
| 03/19/2010 | Individuals Exam | 3h 30m 0s | 2m 6s | 75 ✓ | 25 ○ | 75% |

Click on a column above to sort the table.

✱ Only Exams Marked Finished Tabulate

Community Time
Total Exam Questions: 253,887
Average Time per Question: 1m 12s

Test Answers Report

| Dashboard | Click ✚ to show the question or ■ to hide the question.
Click on the ▬▬▬ bar to see your answers for that test. |

702 ⎫
Health Insurance Deductions and the S Corporation Shareholder Test [Click bar to display the answers]    Failed on 02/13/2011 in 6m 21s with a score of 0%

Q# Question                                                                                    Your Answer   Result   Date 704 ⎧ ✚ 1 The following are advantages of an S Corporation, except?                                                        12/09/2010
    ⎩ ✚ 2 Distributions paid to an S corporation shareholder employee are not wages, and therefore not subject...          12/09/2010

704 ⎧ ✚ 3 Accident and health insurance premiums paid or furnished by an S corporation...                                  12/09/2010
    ⎩ ✚ 4 In order to deduct the cost of health insurance premiums, the S corporation must...                              12/09/2010

✚ 5 An S corporation must may deduct the cost of insurance premiums for all the following, except:                   12/09/2010

702 ⎫
Tax Preparer Ethics Test [Click bar to display the answers]                                    Passed on 10/11/2010 in 36s with a score of 100%

702 ⎫
Tax Preparer Ethics Test [Click bar to display the answers]                                    Failed on 10/11/2010 in 41s with a score of 30%

*Fig. 7a*

Dashboard

Matt McBride
Member Since 02/11/2010
Orlando, FL 32814
Credentials: MBA
Credibility score is 76 out of 100

View Matt's credibility report

Matt's Credibility Report

Credibility is a score based on your participation within the community. You can earn a maximum of 100 points by creating a page and posting frequent updates to it or by answering questions. The detailed report below explains all of the activities that can build your credibility.

- Points were awarded for creating page(s)
- Points were awarded for creating page updates
- Points were awarded for subscribing to page(s) ✱
- Points were awarded for making connections
- Points were awarded for creating question(s)
- Points were awarded for question votes ✱
- Points were awarded for answering questions
- Points were awarded for answer votes ✱
- No points awarded yet for correct answer(s) ✱
- Points were awarded for earning a tax or finance designation ✱
- Points were awarded for completing CPE courses ✱
- No points were deducted for lack of recent participation ✱ Identifies great ways to earn credibility quickly.

[ Connect ] [ Contact ]

Page(s) Matt Contributes To

Fast Forward Academy Test Prep. & CPE
Fast Forward Academy, LLC provides companies and individuals around the world with the tools to help them efficiently manage their professional education needs. The name Fast Forwa ...
529 Versailles Drive, Suite 205, Maitland, FL 32751 via: Matt    890 views    04/14/2011 10:30 PM    view the page

*Fig. 9c*

SYSTEM AND METHOD FOR EDUCATION INCLUDING COMMUNITY-SOURCED DATA AND COMMUNITY INTERACTIONS

CROSS-REFERENCE TO RELATED APPLICATIONS

This application is a continuation of U.S. patent application Ser. No. 13/248,323, filed Sep. 29, 2011 and entitled SYSTEM AND METHOD FOR EDUCATION INCLUDING COMMUNITY-SOURCED DATA AND COMMUNITY INTERACTIONS, which claims priority to U.S. Provisional Application No. 61/457,362, filed Mar. 9, 2011 and entitled A STUDY METHOD AND SYSTEM FOR COMPARING A STUDENTS PERFORMANCE TO A GROUP OR COMMUNITY OF LIKE STUDENTS AND EXPOSING OPPORTUNITIES FOR IMPROVEMENT, the entire contents of which are hereby incorporated by reference.

BACKGROUND

Computer-based and internet-based education systems allow students to complete coursework relating to educational, professional, or other requirements, without being present in the classroom. However, interactions between the individual students that take courses on such education systems are typically limited. The limited ability to interact with other students can reduce the efficacy of the educational material, as the students are not able to discuss common problems and answers. Additionally, the students are not able to compare their performance to the performance of other students, reducing the motivation of the students by removing the competitive aspect of the course.

A solution that allows individual students to interact with and compare performance to other students involved with the same coursework is therefore desired.

SUMMARY

According to at least one exemplary embodiment, a system and method for education including community-sourced data and community interactions may be disclosed. The system can include a plurality of user accounts, a plurality of educational modules, a community interaction module, and a database, wherein the system is operable to register a plurality of users in a database, present educational material to a user of the plurality of users, record the performance of the user in regards to the educational material, collect personal statistics regarding the performance of the user, compile the personal statistics for the plurality of users to generate community statistics regarding the performance of the plurality of users, compare the personal statistics of a user to the community statistics or to a subset thereof, collect personal information from each user of the plurality of users, subdivide the plurality of users into a plurality of communities based on the personal information of each user, facilitate interactions between the users within a community of the plurality of communities, and generate a credibility score for each user within the community.

The method can include registering a plurality of users in a database, presenting educational material to a user of the plurality of users, recording the performance of the user in regards to the educational material, collecting personal statistics regarding the performance of the user, compiling the personal statistics for the plurality of users to generate community statistics regarding the performance of the plurality of users, comparing the personal statistics of a user to the community statistics or to a subset thereof, collecting personal information from each user of the plurality of users, subdividing the plurality of users into a plurality of communities based on the personal information of each user, facilitating interactions between the users within a community of the plurality of communities, and generating a credibility score for each user within the community.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIG. 3a-3c show exemplary study question module report interfaces.

FIGS. 5d-5f show exemplary practice exam module report interfaces.

FIG. 7a shows an exemplary education module answers report interface.

FIG. 9c shows an exemplary community user profile interface.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Figure 1A:
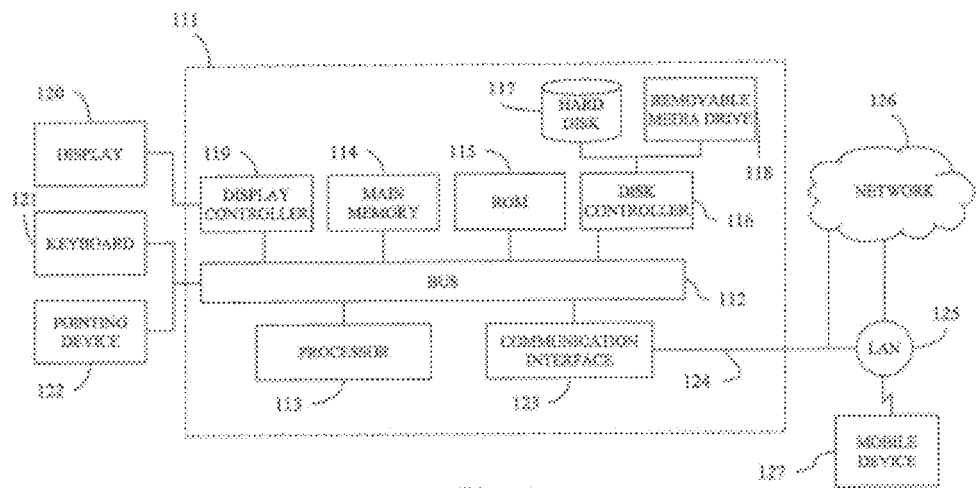
FIG. 1a is a diagram of an exemplary computer system.

FIG. 1a illustrates a computer system 111 upon which an embodiment of the present invention may be implemented. The computer system 111 includes a bus 112 or other communication mechanism for communicating information, and a processor 113 coupled with the bus 112 for processing the information. The computer system 111 also includes a main memory 114, such as a random access memory (RAM) or other dynamic storage device (e.g., dynamic RAM (DRAM), static RAM (SRAM), and synchronous DRAM (SDRAM)), coupled to the bus 112 for storing information and instructions to be executed by processor 113. In addition, the main memory 114 may be used for storing temporary variables or other intermediate information during the execution of instructions by the processor 113. The computer system 111 further includes a read only memory (ROM) 115 or other static storage device (e.g., programmable ROM (PROM), erasable PROM (EPROM), and electrically erasable PROM (EEPROM)) coupled to the bus 112 for storing static information and instructions for the processor 113.

The computer system 111 also includes a disk controller 116 coupled to the bus 112 to control one or more storage devices for storing information and instructions, such as a magnetic hard disk 117, and a removable media drive 118 (e.g., floppy disk drive, read-only compact disc drive, read/write compact disc drive, compact disc jukebox, tape drive, and removable magneto-optical drive). The storage devices may be added to the computer system 111 using an appropriate device interface (e.g., small computer system interface (SCSI), integrated device electronics (IDE), enhanced-IDE (E-IDE), direct memory access (DMA), or ultra-DMA).

Further, exemplary embodiments include or incorporate at least one database which may store software, descriptive data, system data, digital images and any other data item required by the other components necessary to effectuate any embodiment of the present system known to one having ordinary skill in the art. The database may be provided, for example, as a database management system (DBMS), a relational database management system (e.g., DB2, ACCESS, etc.), an object-oriented database management system (ODBMS), a file system or another conventional database package as a few non-limiting examples. The database can be accessed via a Structure Query Language (SQL) or other tools known to one having skill in the art.

Still referring to FIG. 1, the computer system 111 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 111 may also include a display controller 119 coupled to the bus 112 to control a display 120, such as a cathode ray tube (CRT), liquid crystal display (LCD) or any other type of display, for displaying information to a computer client 204. The computer system includes input devices, such as a keyboard 121 and a pointing device 122, for interacting with a computer client 204 and providing information to the processor 113. Additionally, a touch screen could be employed in conjunction with display 120. The pointing device 122, for example, may be a mouse, a trackball, or a pointing stick for communicating direction information and command selections to the processor 113 and for controlling cursor movement on the display 120. In addition, a printer may provide printed listings of data stored and/or generated by the computer system 111.

The computer system 111 performs a portion or all of the processing steps of the invention in response to the processor 113 executing one or more sequences of one or more instructions contained in a memory, such as the main memory 114. Such instructions may be read into the main memory 114 from another computer readable medium, such as a hard disk 117 or a removable media drive 118. One or more processors in a multi-processing arrangement may also be employed to execute the sequences of instructions contained in main memory 114. In alternative embodiments, hard-wired circuitry may be used in place of or in combination with software instructions. Thus, embodiments are not limited to any specific combination of hardware circuitry and software.

As stated above, the computer system 111 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 111, for driving a device or devices for implementing the invention, and for enabling the computer system 111 to interact with a human client. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 113 for execution. A computer readable medium may take many forms, including but not limited to, non-volatile media, volatile media, and transmission media.

Non-volatile media includes, for example, optical, magnetic disks, and magneto-optical disks, such as the hard disk 117 or the removable media drive 118. Volatile media includes dynamic memory, such as the main memory 114. Transmission media includes coaxial cables, copper wire and fiber optics, including the wires that make up the bus 112. Transmission media also may also take the form of acoustic or light waves, such as those generated during radio wave and infrared data communications.

Various forms of computer readable media may be involved in carrying out one or more sequences of one or more instructions to processor 113 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 111 may receive the data on the telephone line and use an infrared transmitter to convert the data to an infrared signal. An infrared detector coupled to the bus 112 can receive the data carried in the infrared signal and place the data on the bus 112. The bus 112 carries the data to the main memory 114, from which the processor 113 retrieves and executes the instructions. The instructions received by the main memory 114 may optionally be stored on storage device 117 or 118 either before or after execution by processor 113.

The computer system 111 also includes a communication interface 123 coupled to the bus 112. The communication interface 123 provides a two-way data communication coupling to a network link 124 that is connected to, for example, a local area network (LAN) 125, or to another communications network 126 such as the Internet. For example, the communication interface 123 may be a network interface card to attach to any packet switched LAN. As another example, the communication interface 123 may be a wireless link. In any such implementation, the communication interface 123 sends and receives electrical, electromagnetic or optical signals that carry digital data streams representing various types of information.

The network link 124 typically provides data communication through one or more networks to other data devices. For example, the network link 124 may provide a connection to another computer or remotely located presentation device through a local network 125 (e.g., an 802.11-compliant wireless network) or through equipment operated by a service provider, which provides communication services through a communications network 126. In preferred embodiments, the local network 124 and the communications network 126 preferably use electrical, electromagnetic, or optical signals that carry digital data streams. The signals through the various networks and the signals on the network link 124 and through the communication interface 123, which carry the digital data to and from the computer system 111, are exemplary forms of carrier waves transporting the information. The computer system 111 can transmit and receive data, including program code, through the network(s) 125 and 126, the network link 124 and the communication interface 123. Moreover, the network link 124 may provide a connection through a LAN 125 to a mobile device 127 such as a personal digital assistant (PDA) laptop computer, or cellular telephone. The LAN communications network 125 and the communications network 126 both use electrical, electromagnetic or optical signals that carry digital data streams. The signals through the various networks and the signals on the network link 124 and through the communication interface 123, which carry the digital data to and from the system 111, are exemplary forms of carrier waves transporting the information. The processor system 111 can transmit notifications and receive data, including program code, through the network(s), the network link 124 and the communication interface 123.

Other aspects of the invention may include data transmission and Internet-related activities. See Preston Gralla, How the Internet Works, Ziff-Davis Press (1996), which is hereby incorporated by reference into this patent application. Still other aspects of the invention may utilize wireless data transmission, such as those described in U.S. Pat. Nos. 6,456,645, 5,818,328 and/or 6,208,445, all of which are hereby incorporated by reference into this patent application.

Figure 1B:
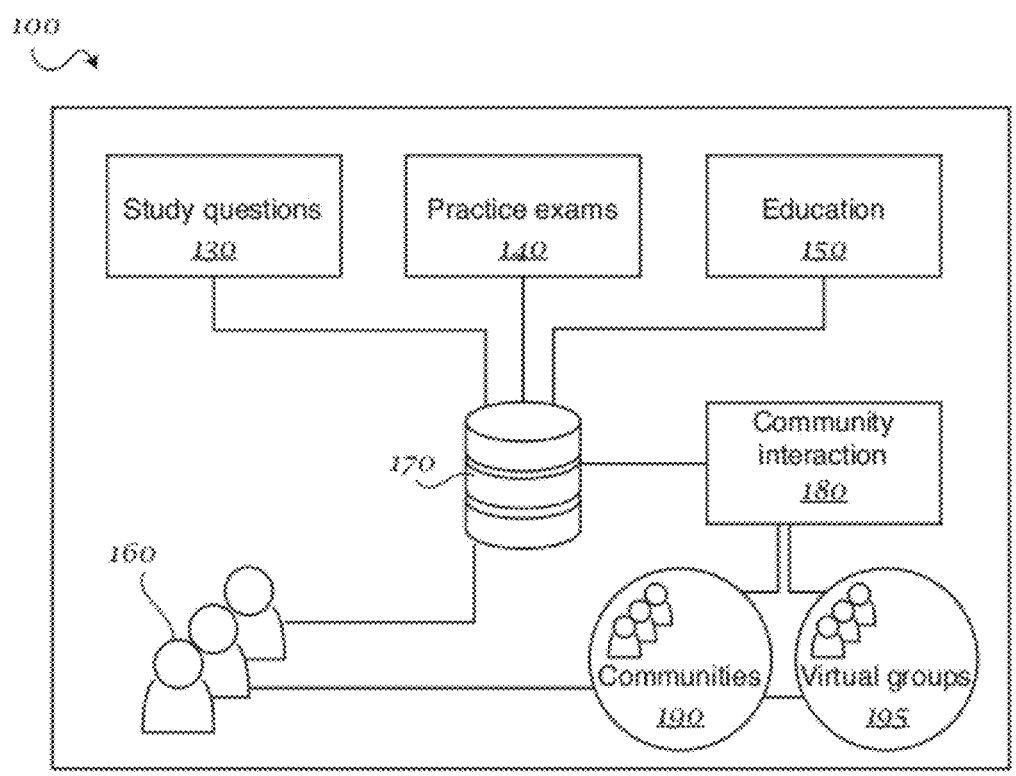
FIG. 1b is a diagram of an exemplary embodiment of a system for education.

Turning to FIG. 1b, and according to at least one exemplary embodiment, a computer-implemented system 100 for education including community-sourced data and community interactions may be disclosed. System 100 may include a plurality of functional modules for implementing the various aspects of system 100. Such modules may include, but are not limited to, a study module 130, a practice exam module 140, and an education module 150. System 100 may be adapted for any subject matter, such that each module can utilize a similar framework and appearance while presenting content related to the particular subject matter. The subject matter for use with system 100 may be any subject matter, including professional education, professional examination, continuing professional education, and so forth; however, it is contemplated that system 100 may be utilized by individuals at any educational level, including university, graduate school, high school, and so forth.

System 100 may be accessible by a plurality of users 160, and each user 160 may maintain a user account with system 100. System 100 may further include at least one database 170, wherein the database may be used by system 100 to store any desired information, for example, but not limited to, course information and content, exam questions, practice exams, question and exam weight, statistical information, user accounts and personal user information, personal user statistics, and any other desired information. Statistical information which may be collected by system 100 can include, for example, whether a particular question was answered correctly or incorrectly, which and how many users answered the question correctly or incorrectly, the amount of time and/or tries taken to answer the question, the dates and times the question was answered, and any other desired information. Personal user statistics may include, for example, which questions the user has answered correctly, which questions the user has answered incorrectly, which questions the user has skipped, the time taken to answer a particular question or exam, the dates and times the user has answered a particular question or exam, which courses, chapters, sections, and subsections the user has purchased, commenced, and completed, and any other desired information. Personal user information may include, for example, the user's identifying information, professional memberships, educational institutions, educational requirements, professional requirements, personal interests, professional interests, educational interests, and any other desired personal information.

System 100 may further analyze collected statistical information and personal user statistics to generate and display reports based on the statistical information and personal user statistics. Such reports may include data related to the statistics and performance of other users, allowing a user to compare personal performance and statistics with community performance and statistics, and may be discussed further below.

For each module included in system 100, the system may utilize a "dashboard" interface for user interaction. The dashboard interface can include a plurality of information groups and can present any desired content in a summary view that can be easily observable and understandable by the user. The user can then select any desired information group, a portion of an information group, or content displayed therein, whereupon system 100 can display detailed information pertaining to the selected content.

System 100 can further include a community interaction module 180, which can create dynamic communities 190 and virtual study groups 195 based on commonalities between users 160. Community interaction module 180 can create user communities 190 at any desired granularity level, including the course level, the subject level, the chapter level, the question level, and so forth. The connection between a particular user 160 and a community may be transitory, in that as the interests of a user or group of users 160 change, the system can associate the particular user or group of users 160 to a relevant community 190. The members of each community can dynamically evolve based upon the activity of all users within the community. Additionally, community interaction module 180 can include social aspects due to communities 190 being built at the question level, and virtual study groups 195 being based on interests, which may be assigned and/or user-selected. Community interaction module 180 can determine with which areas of study a user 160 is engaged, and can subscribes the user to relevant communities 190 based on the user's current activity.

Users 160 can be automatically associated with a particular community by community interaction module 180. Such associations may be based on any desired criteria, for example, but not limited to, common subject matter being studied by the users, common interests of the users, the aptitude level of the users, and any other desired commonalities between the users.

When using system 100, a user 160 may be provided with the option of entering queries about the subject matter displayed. Other users within the community can be automatically notified using an electronic method, and may choose to respond to the user's queries. The responses can then be posted within the community, and users connected to that question can receive notification of the response. All users may post questions and answers, may elaborate on the subject covered, or may rate or otherwise give feedback on answers provided by other users. Increased positive feedback can then bolster a user's credibility within a community or study group. Users who receive notification of posted queries are selected based on factors such as credibility, subject history, and momentum score for a test section or chapter, based on question classification. System 100 may allows users to further build credibility based on performance within a community 190 or a group 195. Additionally, if desired, the educational content provided by the various modules of system 100 may be modified by the user community, or by users within the community having sufficient aptitude or credibility to modify the educational content.

Figure 2:
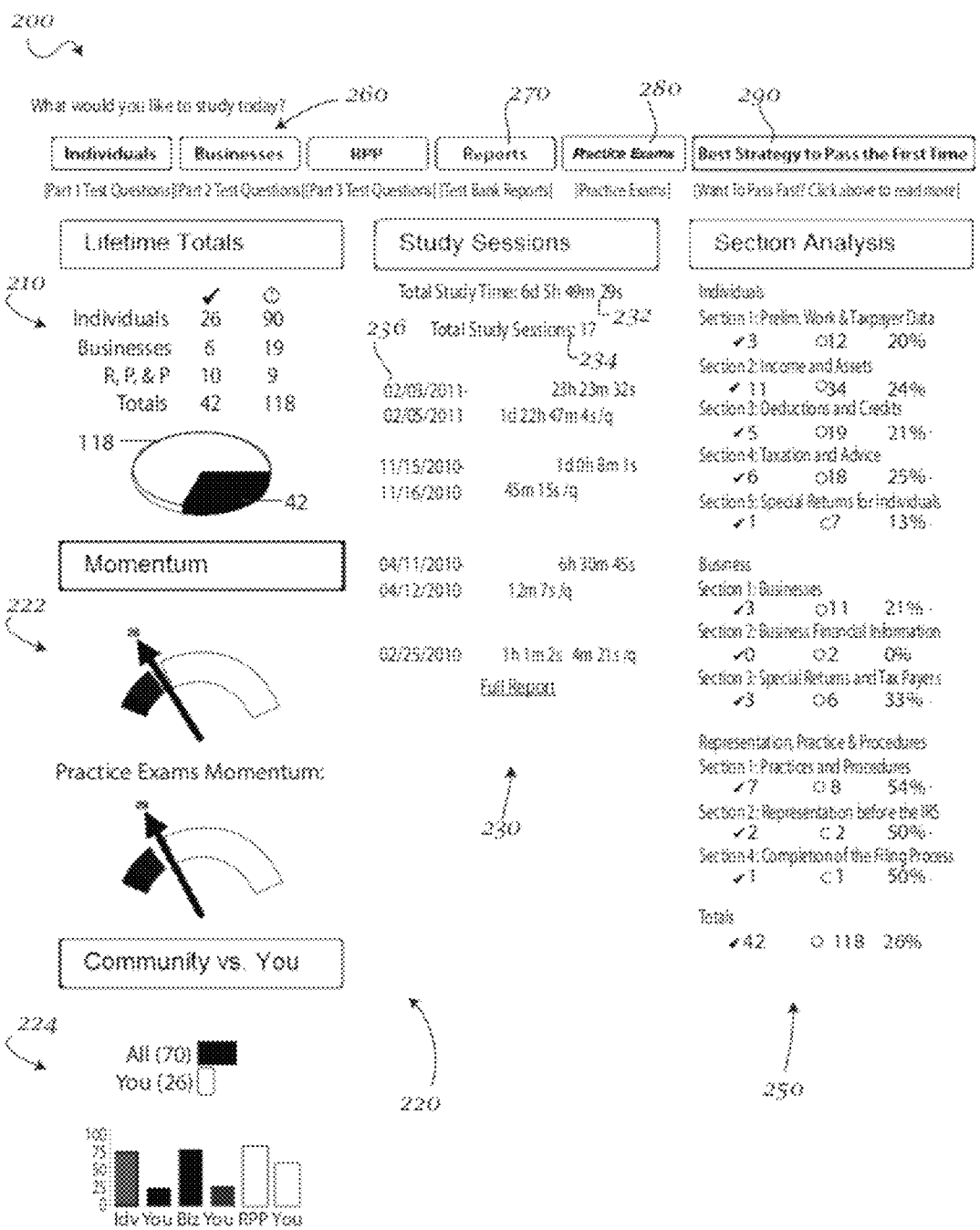
FIG. 2 shows an exemplary study question module dashboard interface.

Turning to FIG. 2, an exemplary study module dashboard 200 for a study module 130 may be shown. Study module dashboard 200 can include a lifetime statistics information group 210, a community analysis information group 220, a study session information group 230, and a course statistics information group 250.

Lifetime statistics information group can include data pertaining to the number of questions answered correctly, number of questions answered incorrectly, and any other desired lifetime statistics. The statistics may be presented in textual or visual form, may include total amounts, and may be broken down to any desired level of granularity, for example, by account, course, subject, unit, chapter, section, subsection, and so forth.

Community analysis information group 220 can include a "momentum" group 222. The momentum can be a calculation based on the total lifetime average percentage of questions answered correctly. Momentum can be calculated by dividing the total number of questions that the user has answered correctly by the total number of questions that the user has attempted to answer. Momentum can be calculated for any desired level of granularity, for example by account, course, subject, unit, chapter, section, subsection, and so forth. Momentum can further be displayed in textual or visual form, and may include the use of color to represent desired ranges of values.

Community analysis information group 220 can also include a community comparison group 224. Community comparison group 224 can present the user with a ranking comparing the user's personal statistics to community statistics for any desired level of granularity. The community comparison can allow a user to compare personal performance with community performance by seeing how the particular user ranks within the community. Levels of granularity for which the comparisons can be made can include, as a non-limiting example, course, subject, unit, chapter, section, and subsection, as well as particular exams, particular locations, groups of particular questions, particular categories of questions, and any other granularity levels that may be contemplated or desired. The opportunity to present a student with granular details of their performance can facilitate emphasizing to the user any available opportunities for improvement, thereby allowing the user to improve his or her performance and likelihood of passage for subsequent exams.

Study session information group 230 can include statistics for all or any desired study sessions that the user has undertaken. Study session information groups can include total study time 232, total study sessions 234, and individual session dates and times 236.

Course statistics information group 250 can include information regarding the user's performance for a particular course, or any other desired level of granularity. Such information can include, for example, which questions the user has answered correctly, which questions the user has answered incorrectly, and the weight of the questions within the selected level of granularity. For example, the course statistics information 250 may be subdivided by subject and section, with the relevant data shown for each, as well as totals for all the data shown in the course statistics information 250. However, any desired granularity level may be displayed, for example, but not limited to, course, subject, unit, chapter, section, subsection, and so forth.

Study module dashboard 200 can further include additional links that the user may select to view a corresponding aspect of study module 130, or a corresponding module of system 100. Such links may include links to study questions 260, reports 270, practice exams 280, and assistance 290. Additionally, links may also be provided within corresponding information groups of study module dashboard 200.

Figure 3D:
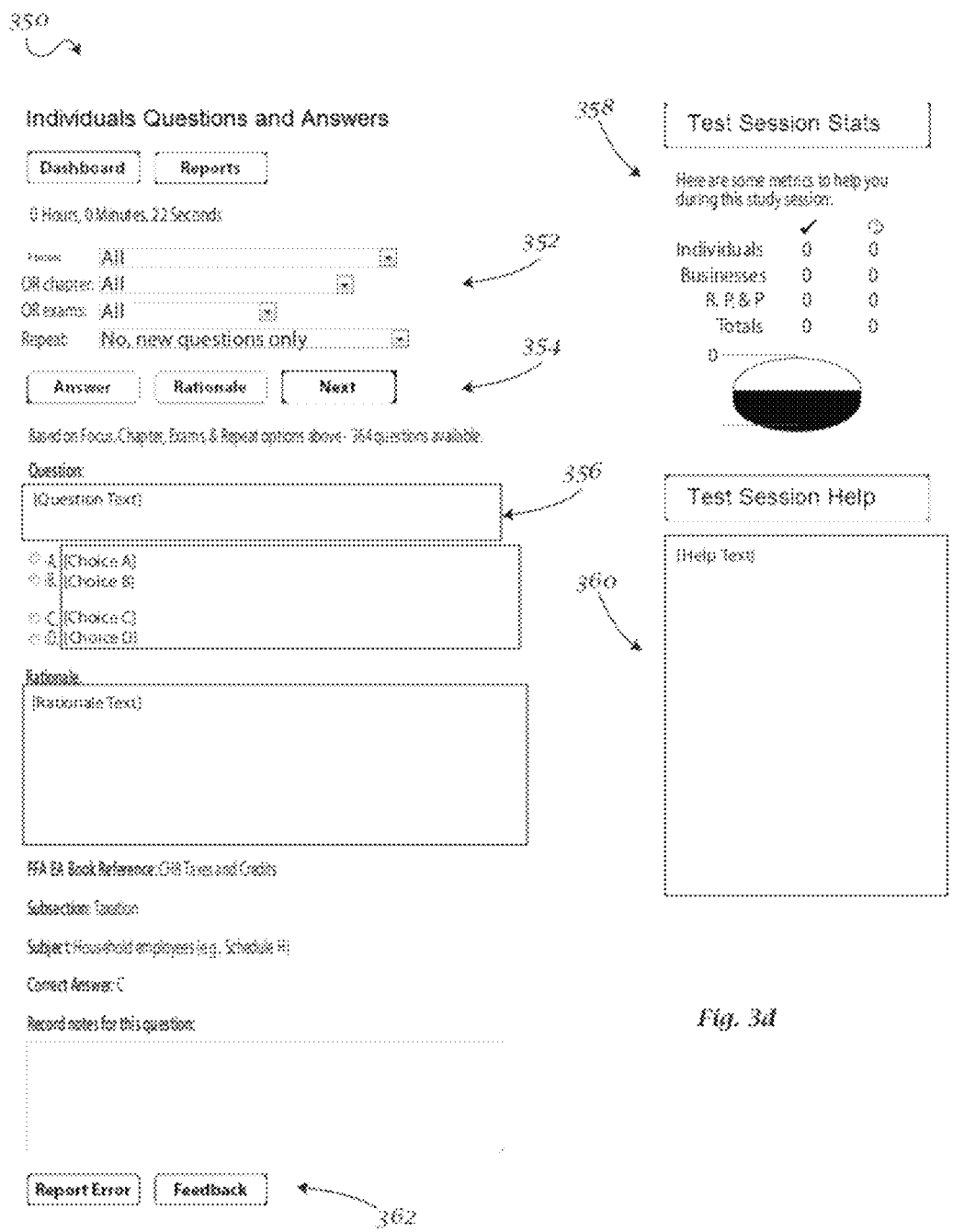
FIG. 3d shows an exemplary study question module question interface.

If a user selects reports link 270, system 100 may present the user with reports related to study module 130, which are shown in FIGS. 3a-3d. Turning to FIG. 3a, an exemplary progress report 300 may be shown. Progress report 300 can be subdivided by exam, by section 302, by subsection 304, by chapter 306, or by any other desired level of granularity. For the desired granularity level, progress report 300 can display the total amount of questions answered, the amount of questions answered correctly 308, the amount of questions answered incorrectly 310, percentage of questions answered correctly 312, and the test weight 314. Progress report 300 can also include totals 316 for each division or subdivision of the progress report. Links 318 to other reports or to the dashboard may further be displayed along with progress report 300.

Turning to FIG. 3b, an exemplary answers report 320 may be shown. Answers report 320 can display a question list 322, which may be filtered by questions answered correctly and questions answered incorrectly, as well as data 324 related to the particular questions. Such data may include question number, unit, section, subsection, the correct answer, the user's answer, correct or incorrect status, and the date. The number of times the question was answered correctly and the total number of attempts to answer the question may also be shown, for example, as a fraction next to the user's answer. An information panel 326, which may be a collapsible panel within question list 322, can display the question subject, the reference for the question, question text, the answer choices, the correct answer, the rationale and explanation for the answer, and any other desired information.

FIG. 3c shows an exemplary notes report 330. Notes report 330 can include a question list 332, which may have a substantially similar configuration to question list 322 of answers report 320, and can display question data 334. Notes report 330 can be filtered to display questions where the user has made a note, and can show the date the note was created. An information panel 336, which may be a collapsible panel within question list 332, can display the contents of the note, the question and answer choices, the correct answer, the rationale and explanation for the answer, and any other desired information.

A study time report can include a session list, and can further show the total time spent using test module 130, the average answer time, and the total number of study sessions for the user. The session list can show a listing of all study sessions, and can display pertinent information, such as time and date of the session, total time taken, average time taken per question, questions answered correctly and incorrectly, total questions answered, percentage of questions answered correctly, and any other desired information.

If a user selects a link to study questions 260, the system can present the user with a question interface 350, which is shown in FIG. 3d. Question interface 350 can include filter choices 352, for allowing the user to narrow or broaden the pool of questions available, for example by focus, chapter, practice exams, and by various question repetition options. The focus filter can allow the user to pick a certain section, or other level of granularity, from which the questions will be sourced. The chapter filter can allow the user to select a chapter in the book to focus on and can be part of a larger study process wherein the student can review a chapter in the course material and then answer questions relating to the particular chapter, so as to apply what the user has learned in the course material. The exams filter can allow the user to repeat exams that were previously taken using practice exam module 140. The repeat filter can allow the user to choose whether only new questions, new and incorrect questions, questions answered incorrectly, or any question should be displayed. If the user selects to only receive incorrect questions, the user can be presented with each question once per study session, and the questions may be repeated during a subsequent study session.

Question interface 350 can further include links 354 to enter an answer to the question being viewed, to display the rationale for the answer, or to display the next question. A question area 356 can display the question text, the question choices, the correct answer, the rationale for the answer, the reference, subsection and subject of the question, and a field for entering notes regarding the question. A statistics group 358 can display the number of questions answered correctly and incorrectly for a desired level of granularity and as a total. The statistics group 358 can be updated in real time, and can present the information in a textual or visual format. A help group 360 can display context-relevant assistance to the user, and links 362 for error reporting and feedback may also be provided.

Utilizing question interface 350, the user can answer a question as many times as desired and can view the rationale as desired. Questions may be selected based on the filters set by filter choices 352 and can be selected randomly. The user can select the desired answer and select the answer button, whereupon the system can provide feedback as to whether the question was answered correctly or incorrectly. The user can then decide to change the answer and submit it again, view the rationale, move on to a new question, set new filters and so forth. Study module 130 can provide any desired number of questions, and the user may attempt to answer the questions as many times as desired. As the user answers questions, system 100 can record statistical information regarding the answered questions, and the statistics for the study session can be updated in real-time. The dashboard can then be updated in real-time along with any provided reports. The time spent studying via study module 130 can also be displayed to the user while the user is utilizing question interface 350.

Practice exam module 140 can provide the user with the capability to obtain, create, and take practice exams in conditions that simulate the conditions of an actual exam. Practice exam module 140 can achieve this by creating exams having the same or a similar number of questions, providing same or similar functionality, and providing same or similar time constraints as an actual exam. The practice exams can be created on demand by the user, and multiple exams can be created. If desired, the user may purchase credits so as to take a predetermined quantity of exams, or may purchase an unlimited exam credit. The practice exam module 140 can include a listing of all unfinished exams, delivery of those exams, a tool to create the exams, a dashboard, and reports.

Exams may be generated in real time, provided the user has sufficient credits for creation of additional exams. The user may choose which exam to create, the amount of questions in the exam, the subject matter covered by the exam, and any other desired criteria. The exam generation process can be optimized to maximize the quality of the generated exam by considering, for example, new available questions, questions that the user has previously answered incorrectly, and questions that the user has answered correctly, if no additional questions are available. Consequently, the generated exam can be unique, customized, and adapted to the user and to the user's knowledge and skill base at the time of generation.

Figure 4:
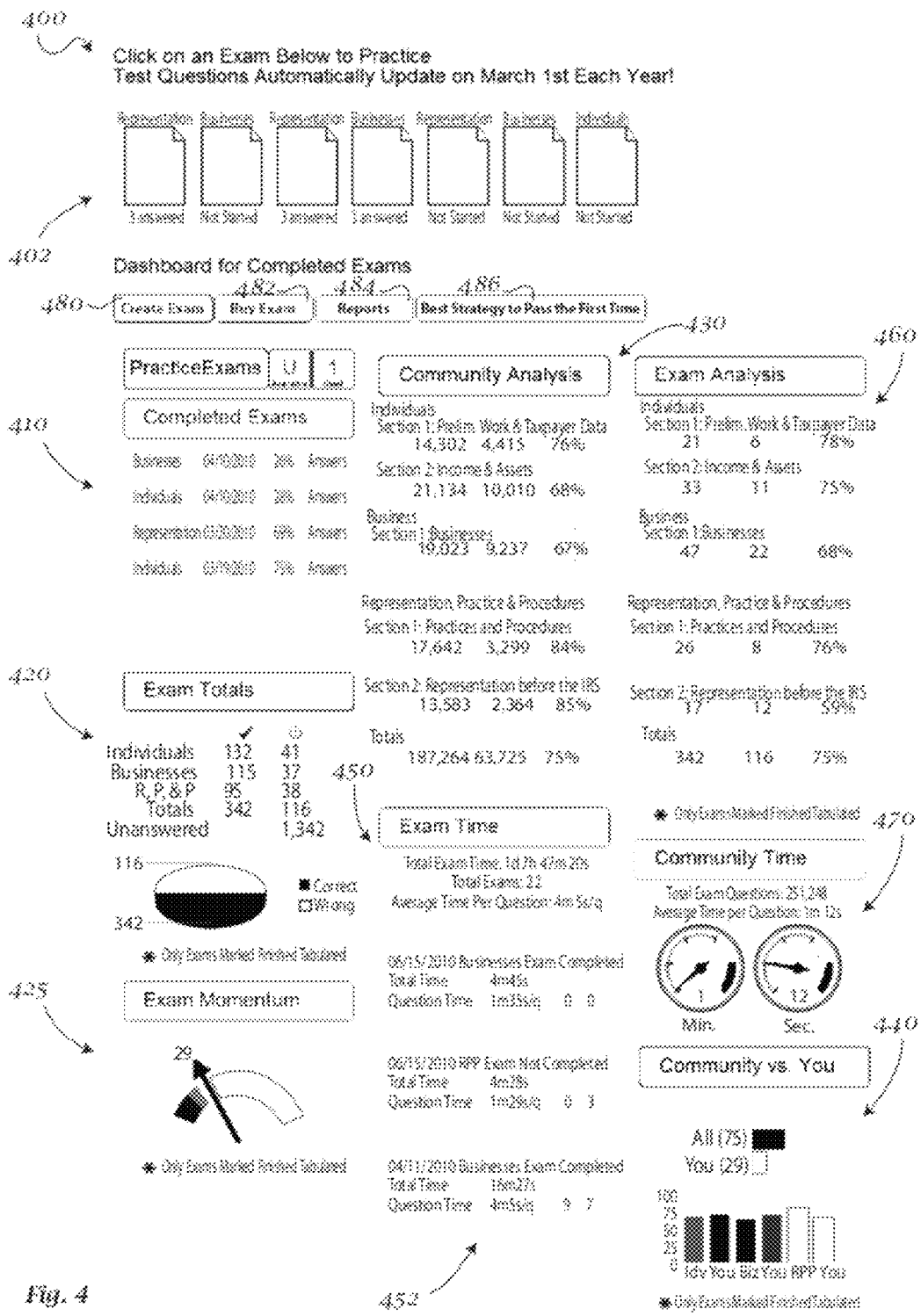
FIG. 4 shows an exemplary practice exam module dashboard interface.

Turning to FIG. 4, an exemplary practice exam module dashboard 400 for practice exam module 140 may be shown. Practice exam module dashboard 400 can include an incomplete exam group 402, a completed exam group 410, an exam total group 420, a momentum group 425, a community comparison group 430, a detailed community statistics group 440, an exam time group 450, an exam analysis group 460, a community time group 470, and any other desired information groups.

Incomplete exam group 402 can list any exams that the user has created or begun but has not completed; for example, newly-created exams or exams in progress. The incomplete exams can be identified by the subject matter of the exam, and the amount of answered questions may also be displayed. The user may select a desired incomplete exam to display exam interface 500, discussed further below.

Completed exam group 410 can show a list of all exams that the user has successfully completed. The exams may be classified by their subject matter, and the date the exam was taken and the percentage of correct answers may be displayed. A link to the answers report interface may also be provided. Exam total group 420 may include total statistics for all the exams successfully completed by the user. Such statistics may include data pertaining to the number of questions answered correctly, the number of questions answered incorrectly, the number of unanswered questions, and any other desired exam statistics. The statistics may be presented in textual or visual form, and may be broken down to any desired level of granularity, for example, by account, course, subject, unit, chapter, section, subsection, and so forth.

Momentum group 425 can display the momentum of the user for the exams that the user has completed. Momentum is an average lifetime percentage of questions answered correctly, and is calculated substantially as described earlier herein. Community comparison group 430 can present the user with a ranking comparing the user's personal statistics to community statistics for any desired level of granularity, substantially as described earlier herein. The community comparison can allow a user to compare personal performance with community performance by seeing how the particular user ranks within the community.

Detailed community statistics group 440 may include statistics relating to community performance for the desired subject matter. The detailed community statistics group 440 can include information as to the number of questions answered correctly by the user community, the number of questions answered incorrectly by the user community, the percentage of correctly answered questions, and the total number of questions answered by the user community. The community analysis statistics may be subdivided by course, subject, unit, chapter, section, subsection, or any other desired level of granularity.

Exam time group 450 can present the user with the total time spent on all exams, the total number of exams taken, and the average time taken per question. Exam time group 450 can also include an exam list 452, wherein the exam date, completion status, total time, average question time, number of correctly and incorrectly answered questions, and any other desired information may be displayed for each exam on list 452. Exam analysis group 460 can be subdivided, by unit, section, subsection, or by any other desired level of granularity. For the desired granularity level, exam analysis group 460 can display the total questions answered correctly, total questions answered incorrectly, percentage of questions, and the weight of the section. Exam analysis group 460 can also include totals for the above-described information.

Community time group 470 may display the total exam questions answered by the user community, and the average time taken per question. Such information may be presented in a textual and/or visual format, as desired.

Practice exam module dashboard 200 can further include additional links that the user may select to view a corresponding aspect of practice exam module 140, or to a corresponding module of system 100. Such links may include links to create exam 480, buy exam credits 482, reports 484, and assistance 486. Additionally, links may also be provided within corresponding information groups of practice exam module dashboard 400.

Figure 5A:
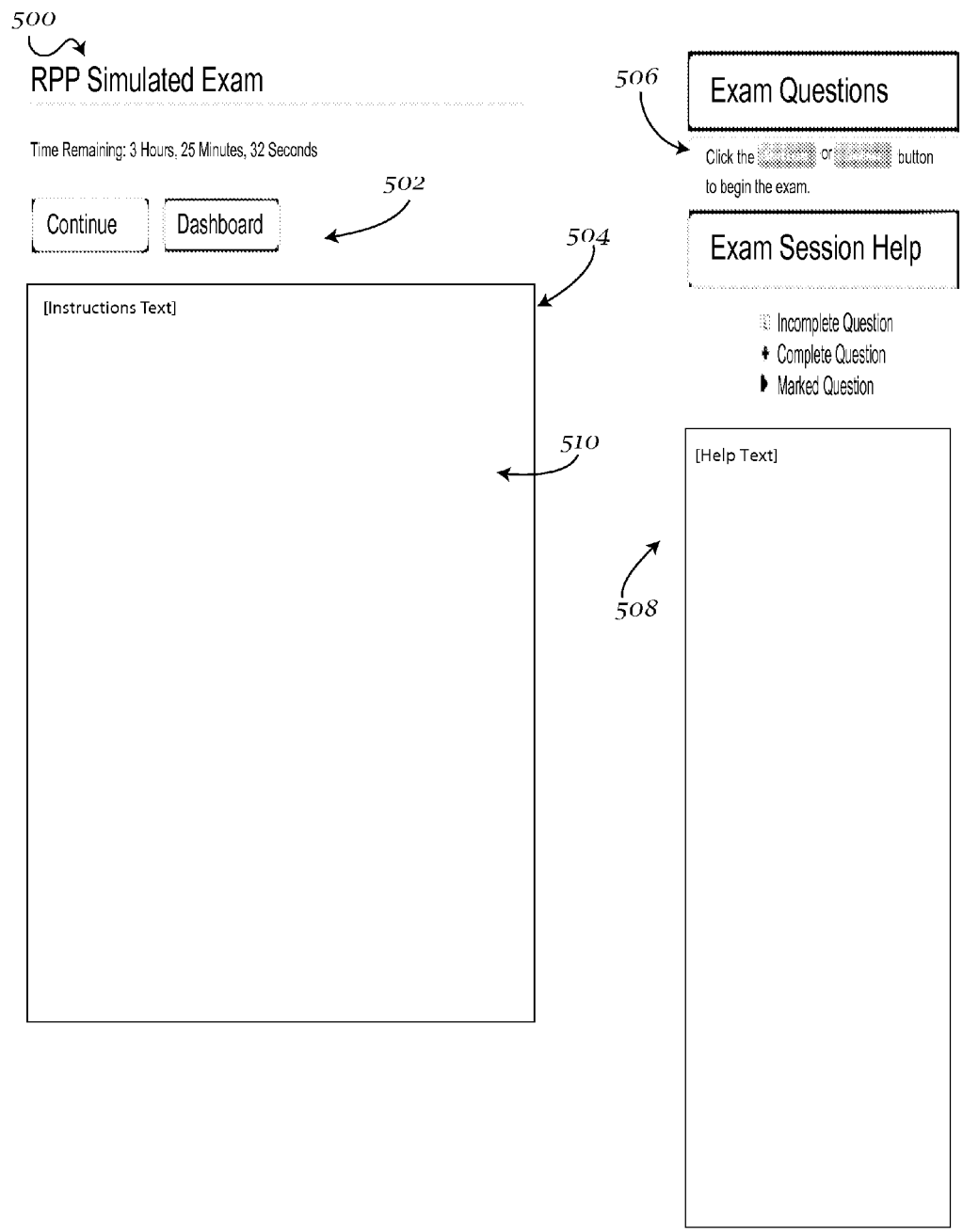
FIGS. 5a-5b show an exemplary practice exam module exam interface.
Figure 5B:
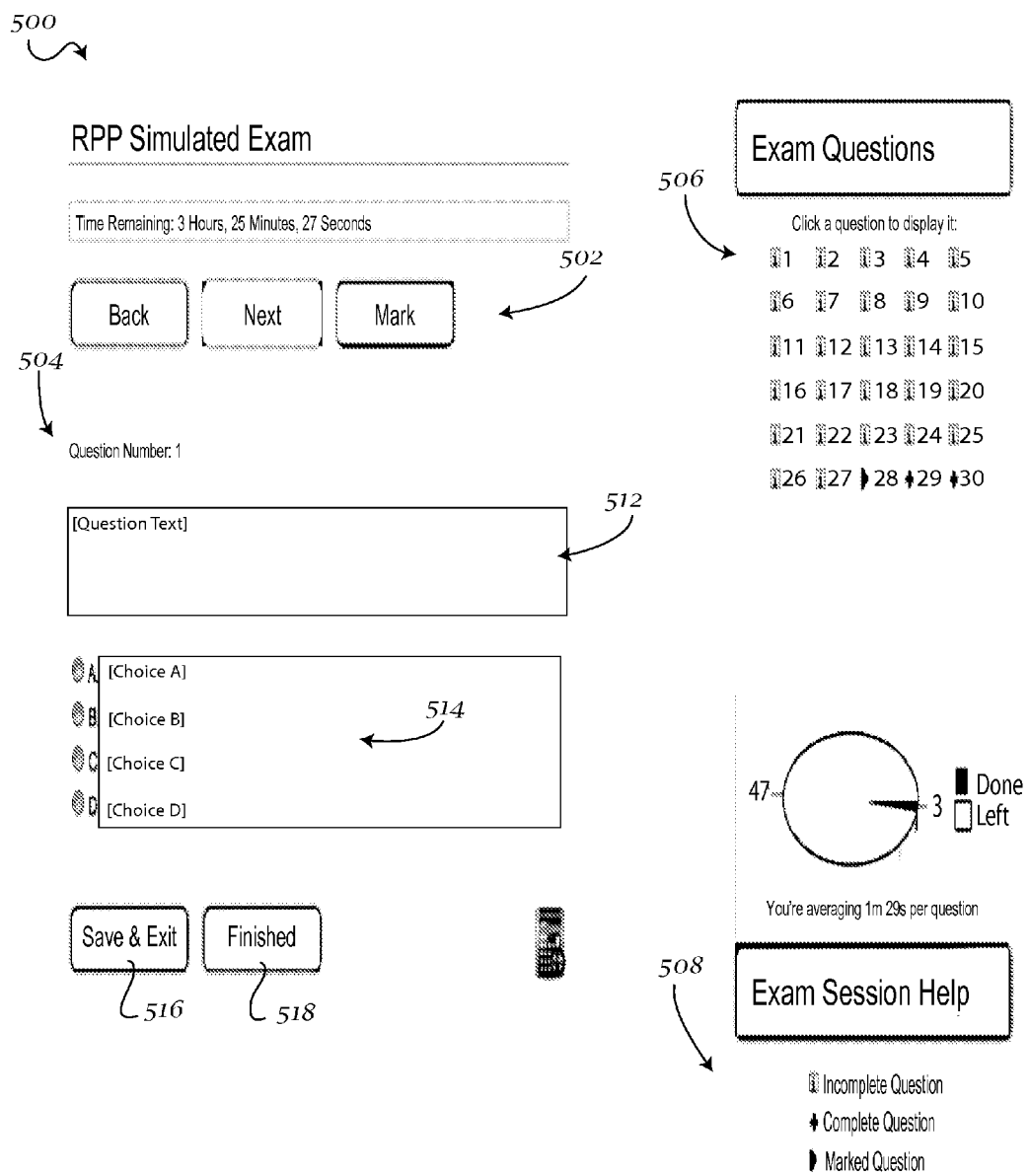

Turning to FIG. 5a, an exemplary exam interface 500 may be shown. Exam interface 500 can include navigation buttons 502, text area 504, question list 506, and user assistance 508. Upon entering the exam interface, text area 504 may display instructions 510 regarding the exam taking procedure, which may be similar to what the user would see when taking a live exam. The user can then start a new exam or continue a previous exam. Turning to FIG. 5b, once the user begins the exam, text area 504 may display the question text 512 and a selection of answers 514. Question list 506 may then display a list of all questions on the particular exam, indicia relating to the status of the question, and the average time taken per question. The question status may be complete, incomplete, or marked, and the amount of complete and incomplete questions may be presented in a textual or visual format. The user may click on a particular question within the question list so as to display that question within text area 504. User assistance portion 508 can provide context-based assistance to the user prior to and during the exam, and may provide an on-screen calculator as well.

As the user is taking the exam, the answers may be recorded based on user selection, questions can be marked for later review, the user can move backwards and forwards within the exam using navigation buttons 502, and the user can click on any question within list 506 to display any exam question as desired. A save & exit button 516 can allow the user to save the exam and exit at any time if the user is not finished, and a finished button 518 can allow the user to mark an exam as finished. Once an exam is marked as finished, the exam can be graded by system 100, and the results can be made available on any relevant dashboards and reports. Exam interface 500 can also display the amount of time remaining 520 for the exam. If the user runs out of time, a notice can be delivered to the user and the exam can automatically be marked as finished.

Figure 5C:
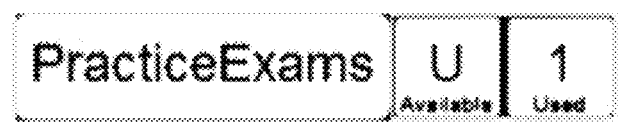
FIG. 5c shows an exemplary practice exam module exam creation interface.
Figure 5C:
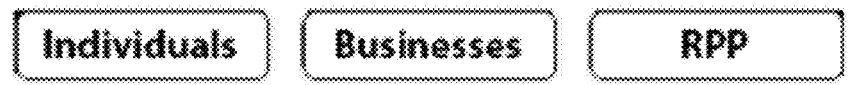
Figure 5C:
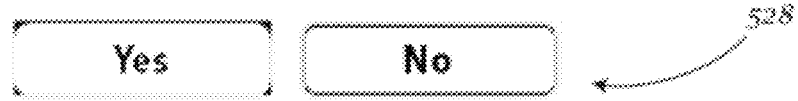
Figure 5C:
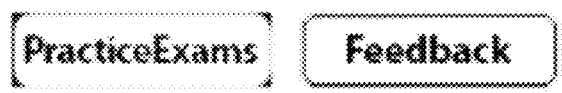

FIG. 5c shows an exemplary exam creation interface 522, which may be accessed via create exam link 480. Exam creation interface 522 can include a list of available and used credits 524, subject matter selection buttons 526, confirmation buttons 528, and navigation buttons 530. Credit list 524 can indicate to the user whether sufficient credits remain in the user account to generate additional exams. Subject matter selection buttons 546 can allow the user to generate an exam based on desired subject matter, or on a desired granularity level. Once the user has selected the subject matter, the user may confirm or disconfirm the selection via confirmation buttons 528 or navigate to another interface via navigation buttons 530.

If a user selects reports link 482, system 100 may present the user with reports related to practice exam module 140, which are shown in FIGS. 5d-5e. Turning to FIG. 5d, an exemplary exam analysis report 532 may be shown, and may include exam list 534 and community list 554. Exam list 534 can be subdivided by exam, by section 536, by subsection 538, by chapter, or by any other desired level of granularity. For the desired granularity level, exam list 534 can display the total amount of questions answered, amount of questions answered correctly 540, amount of questions answered incorrectly 542, percentage of questions answered correctly 544, percentage of questions answered correctly by the user community 548 and the test weight 550. Exam list 534 can also include totals 552 for each division or subdivision of the progress report. Community list 552 may be organized and subdivided substantially similar to exam list 534, and may show the total amount of questions answered correctly by the user community, the total amount of questions answered correctly by the user community, the percentage of questions answered correctly by the user community, and the test weight. Links 556 to other reports or to the dashboard may further be displayed along with exam analysis report 532.

Exam analysis report 532 can further include a subject proficiency list 558. Subject proficiency list can list all subjects on which the user was tested, and can include information as to the unit, section, and subsection in which the subjects are located. Subject proficiency list 558 can further display the amount of questions answered correctly, the amount of questions answered incorrectly, and the percentage of questions answered correctly for each subject. Subject proficiency list may be sorted so as to present the subject list in order of percentage of questions answered correctly, or any other criteria, and may be sorted in ascending or descending format. Furthermore, each subject may be color-coded so as to provide an easy visual indication of the user's proficiency or weakness in a particular subject. As an illustrative example, subjects having a correct answer percentage of less than 25% may be displayed first in the list and highlighted red, subjects having a correct answer percentage between 25% and 75% may be displayed subsequently and highlighted yellow, while subjects having a correct answer percentage above 75% may be displayed subsequently without highlighting.

FIG. 5e shows an exemplary exam answers report 560. Exam answers report 560 can display each exam 562 completed by the user, and can include information relating to the exam date, the percentage of questions answered correctly, the total number of questions answered, the amount of questions answered correctly, and the amount of questions answered incorrectly for each exam. Each completed exam 562 can be expanded so as to display each question 564 on the exam 562, including information pertaining to the question number, the unit, section and subsection of the question, the correct answer, the user's answer, whether the question was marked for review, correct or incorrect status of the answer, and date the question was answered. Each question 564 may further be expanded to reveal additional information 566, including the subject of the question, the reference for the question, the question text, the answer choices, the correct answer, and the rationale for the answer.

FIG. 5f shows an exemplary exam time report 568. The exam time report can display the total time spent taking exams, the total amount of exams taken, the average time per question, and an exam time list 570. For each exam, exam time list 570 can display all exams taken, and can provide pertinent information such as, for example, the date of the exam, the exam unit, total time taken, time taken per question, the amount of questions answered correctly, and the amount of questions answered incorrectly, and the percentage of questions answered correctly. Exam time report 570 can further display the community time 572, including the total questions taken by the user community and the average time per question for the user community.

Education module 150 can provide the user with the capability to obtain and take educational courses, such as, for example, continuing education courses for professionals, courses offered by an educational institution, courses taken to satisfy particular requirements, and so forth. Based on input user information, such as profession or school enrollment, system 100 can refer to known requirements, for example requirements for continuing education completion, or credit-hours necessary for course completion, so as to provide the user with information regarding requirement completion status, available time to complete the requirements, and any other pertinent information. The user can then obtain the necessary courses, for example by purchasing the course via system 100, and complete the course requirements via education module 150. The results of the completed course and any associated exams may then be sent directly to the appropriate educational authority or governing body along with any desired user-identifying information.

Figure 6:
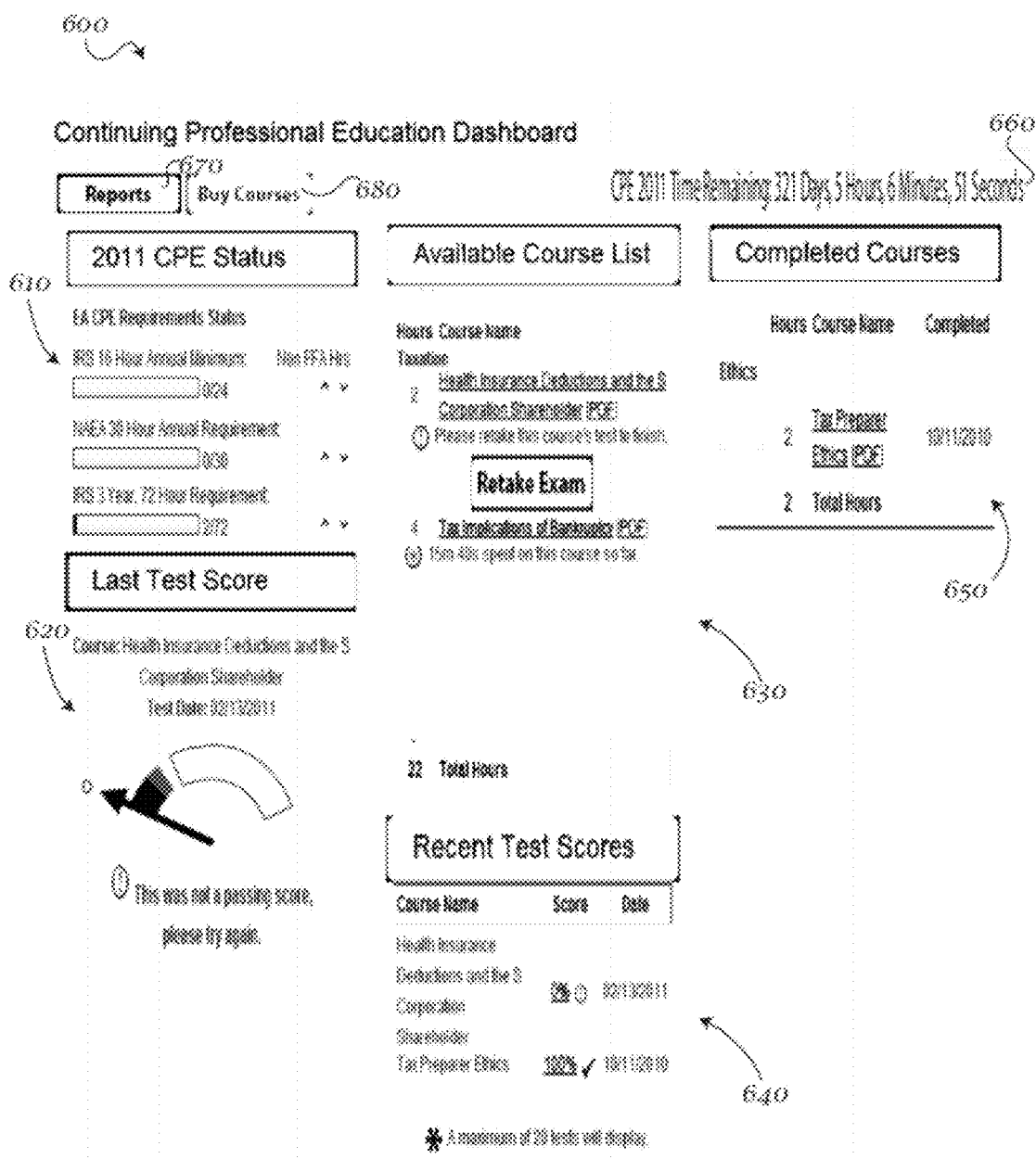
FIG. 6 shows an exemplary education module dashboard interface.

FIG. 6 shows an exemplary education module dashboard 600 for an education module 150. Education module 600 can include a requirement status group 610, a last test score group 620, an available course group 630, a recent test score group 640, a completed course group 650. Education module 600 can further display the remaining time 660 for the user to complete the particular educational requirements, as well as additional links that the user may select to view a corresponding aspect of education module 150, or a corresponding module of system 100. Such links may include links to reports 670, and buying courses 680.

Requirement status group 610 can display the amount of courses, hours, credit-hours, or any other criteria that the user has completed in satisfaction of the user's particular educational requirements, as well as remaining hours, courses, credit-hours, and so forth that the user must complete to fully satisfy the particular educational requirements. Requirement status group 610 can display such information separately for each course, professional association, educational institution, or other entity for which the user has educational requirements, and may display such information in a textual or visual format. Education module 150 may ascertain such information based on known educational requirements, the courses that the user has taken via system 100, as well as user-input hours for any actions in satisfaction of educational requirements that were performed outside of system 100.

Last test score group 620 can display the course name, the exam date, and the exam score of the last exam attempted by the user, and the pass/fail status of the exam. Such information may be displayed in textual or visual form. Recent test score group 640 can show a list of a desired number of exams recently attempted by the user, and, for each exam, can show the course name, the exam date, and the pass/fail status of the exam.

Available course group 630 can display a list of courses that the user has purchased, obtained via an unlimited course package, or otherwise obtained via system 100. For each course listed, available course group 630 can display the course category, the hours (such as, for example, credit-hours or contract-hours) pertaining to the course, the time spent on the course, the completion status of the course, and a retake exam link in the event the student did not pass. Completed course group 650 can display a list of courses completed by the user, and can allow the user to complete a survey related to the course, access the course materials, and view or print the certificate of completion for the course. If the time available for a course year expires, the unlimited course package may be removed from the available course list; however, completed courses can be accessed and the certificate of completion can be retrieved at any time as desired. The course survey can include a pre-defined set of quality control questions, for which the user can select an answer choice of one to five stars, with one star being the poorest and five stars being the greatest. Once the survey is completed the certificate of completion can be made available.

FIG. 7a shows an exemplary exam answers report 700, which the user may access by selecting reports link 670. Exam answers report 700 can display each exam 702 completed by the user for a particular course, and can include information relating to the course name, the exam date, the percentage of questions answered correctly, and the time spent taking the exam. Each exam 702 can be expanded so as to display each question 704 on the exam 702, including information pertaining to the question number, the user's answer, the correct or incorrect status of the answer, and date the question was answered. Each question 704 may further be expanded to reveal additional information, including the question and the list of potential answers to the question.

Figure 7B:
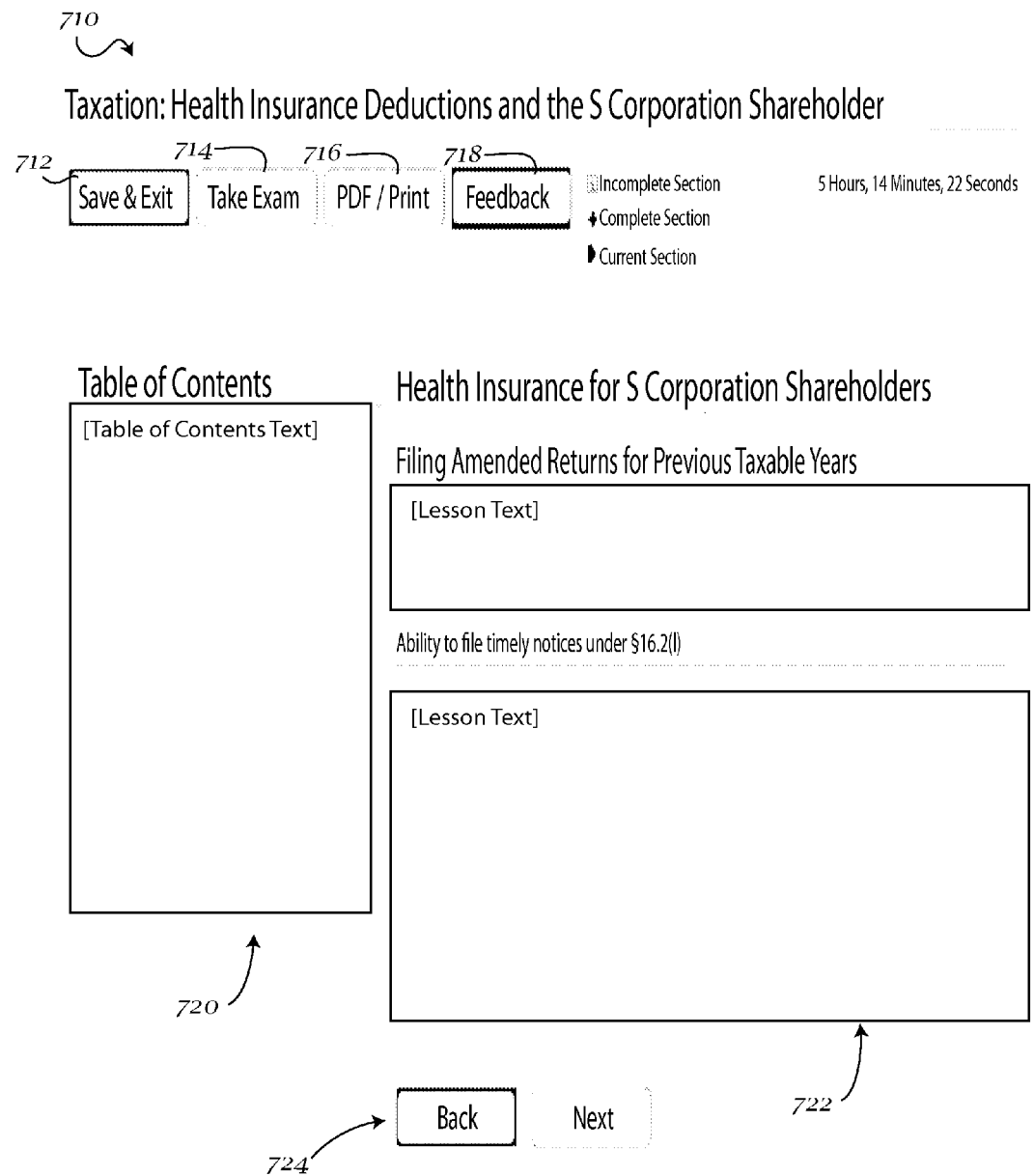
FIG. 7b shows an exemplary education module course interface.

FIG. 7b shows an exemplary course interface 710. Course interface 710 can include links to save and exit the course 712, take the course exam 714, view/print course materials 716, and submit feedback 718. Course interface 710 can further include a table of contents area 720 and a lesson area 722, with navigation buttons 724 provided for allowing the user to change the content displayed in lesson area 722. Table of contents area 720 can track and store the progress of the user within the course in real time. Each section within the table of contents area 720 can be marked to show whether the student is currently viewing that section, has not yet viewed the section, or has already viewed the section. This can allow the user to return to their last position within the course should the user desire to take the course over several separate sessions. Lesson area 722 can display any relevant course content for the section being viewed by the user. Content displayed within lesson area 722 may be any desired content, including web content, text, images, video, music, multimedia, interactive content, and so forth. Additionally, course interface 710 may be self-scrolling, in that the user can decide to keep table of contents 720 fixed or allow the table of contents to to move while the user scrolls and reads the course content. As the user reviews the course content, the user can utilize navigation buttons 724 to move through the content, while course interface 710 can automatically scroll and reset the view to the beginning of a new section of content. The user can also use table of contents 720 to jump between sections as desired.

Figure 7C:
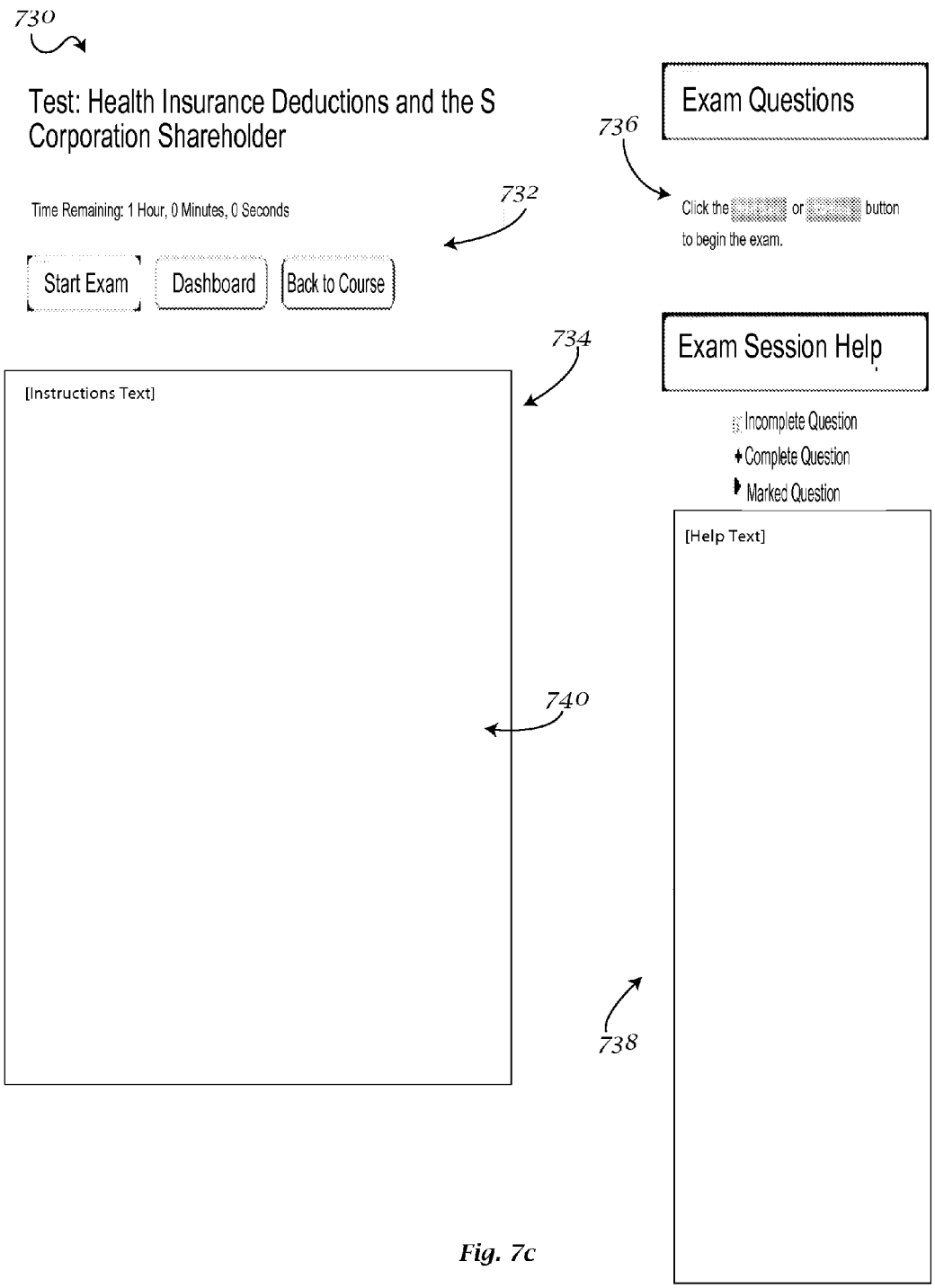
FIGS. 7c-7d show an exemplary education module exam interface.
Figure 7D:
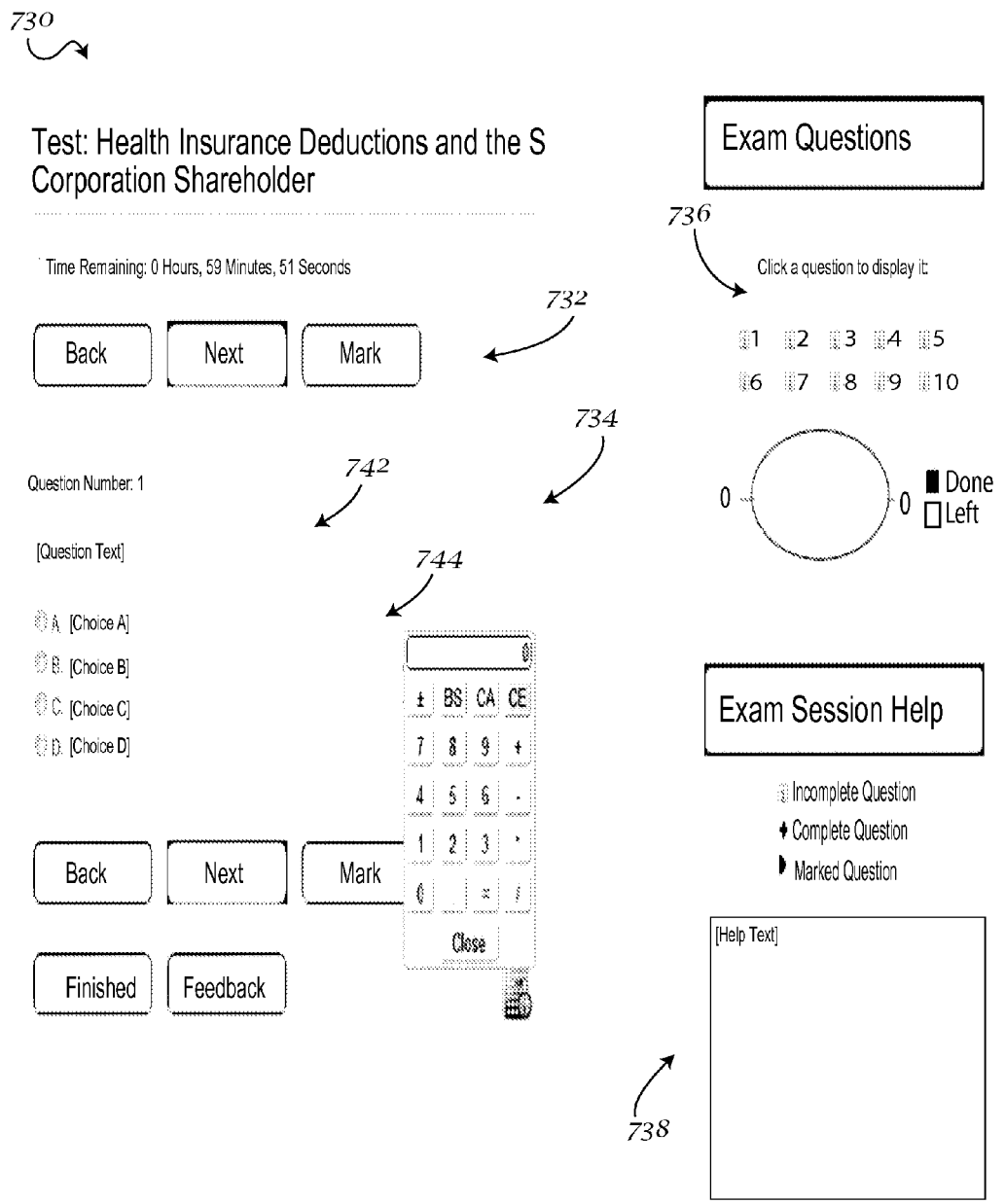

If a user elects to take the exam, for example by selecting take exam button 714, the system can load the exam, the passing percentage for the exam, the time allowed for the exam, and can confirm that the allowed number of exam attempts has not been exceeded. Turning to FIG. 7c, an exemplary exam interface 730 may be shown. Exam interface 730 can include navigation buttons 732, text area 734, question list 736, and user assistance 738. Upon entering the exam interface, text area 734 may display instructions 740 regarding the exam taking procedure and the allowed time for the exam 735. The user can then start the exam or exit the exam interface via navigation buttons 732. Turning to FIG. 7d, once the user begins the exam, text area 734 may display the question text 742 and a selection of answers 744. Question list 736 may then display a list of all questions on the particular exam, indicia relating to the status of the question, and the average time taken per question. The question status may be complete, incomplete, or marked, and the amount of complete and incomplete questions may be presented in a textual or visual format. The user may click on a particular question within the question list so as to display that question within text area 734, or may use navigation buttons 732 to navigate questions sequentially. The user may also mark desired questions so as to return to the question at a later time. User assistance portion 738 can provide context-based assistance to the user prior to and during the exam, and may provide an on-screen calculator as well. When the user finishes the exam, or once the allowed time has expired, education module 150 can mark the exam as finished. Once an exam is marked as finished, the exam can be graded by education module 150, and the results can be made available on any relevant dashboards and reports. Should the user successfully pass the course, the user may be allowed to complete the course survey and access the course completion certificate for viewing, printing, and transmission.

Figure 8:
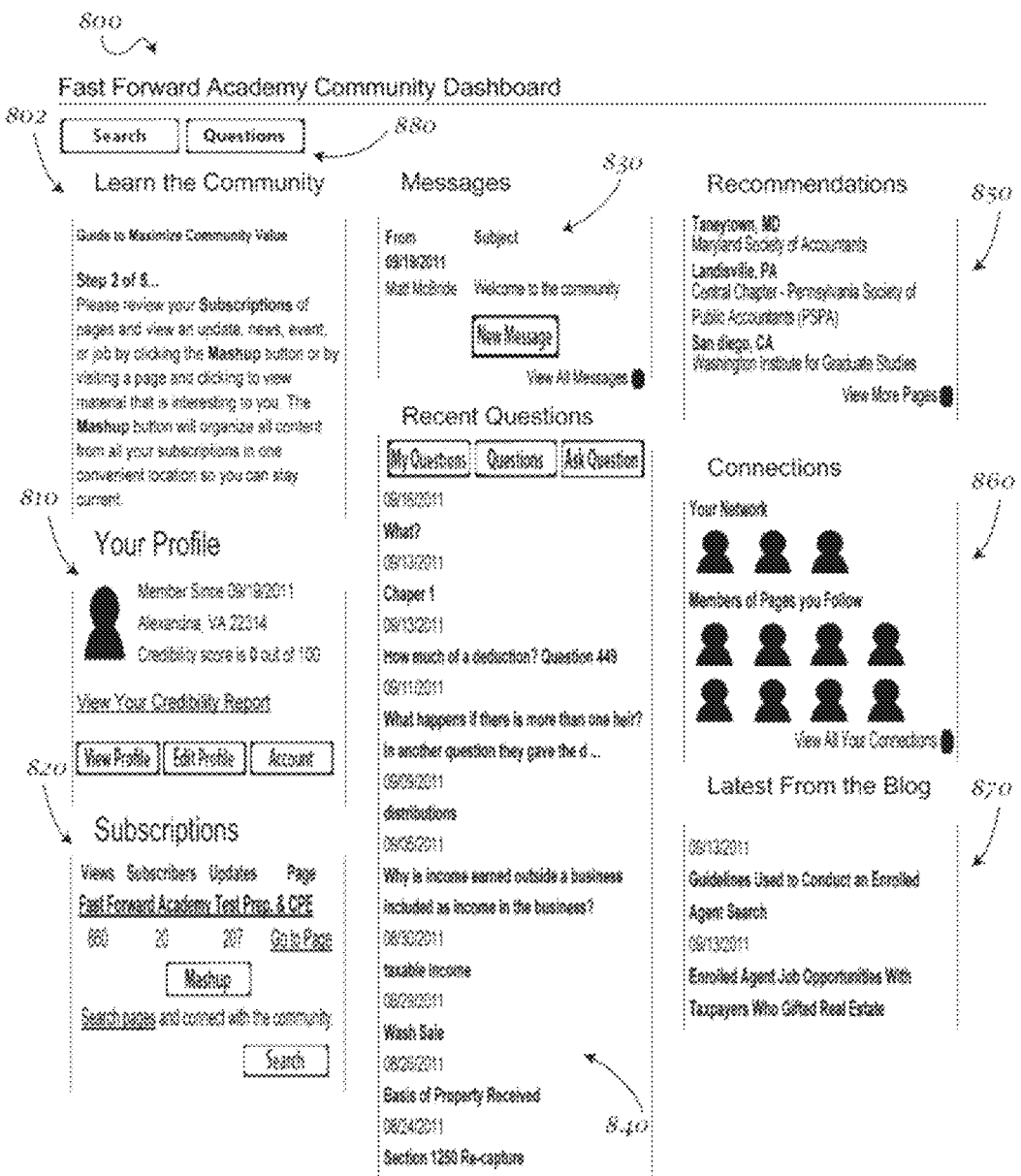
FIG. 8 shows an exemplary community interaction module dashboard interface.

Turning to FIG. 8, an exemplary community interaction module dashboard 800 for practice exam module 180 may be shown. Community interaction module dashboard 800 can include a user guide group 802, a user profile group 810, a subscriptions group 820, a messages group 830, a recent questions group 840, a recommendations group 850, a community connections group 860, a news updates group 870, and any other desired information groups.

User profile group 810 may display information pertaining to the user and the user's reputation in the community, such as, for example, the date when the user registered with system 100, the location of the user, the credibility score of the user, and any other desired information. User profile group 810 may further include links to view or edit the user's profile information or the user's account information, as well as a link to view the user's credibility report. The user's profile information may include a profile picture, a list of the user's professional, educational or other credentials, the user's role (e.g. student, consumer, professional, teacher, association, company, and so forth), and links to any social network profile pages that the user may have. The user's account information may include the user's contact and personal information, the user's interests in subscribing to system 100 (e.g. community, test preparation, continuing education, and so forth), and any other desired information.

Recent questions group 840 can display a list of questions posted by members of the community groups of which the user is a member. The questions may be displayed in reverse chronological order of posting, and the user may select a desired question to view the corresponding page for the particular question, which may include any answers to the question that were provided by members of the community and any additional desired information. The question list may be updated in real time as new questions are submitted to community interaction module 180. Recent questions group 840 can further include links to questions that the user has asked or answered, to all questions asked by members of the community, and to a question composition interface, which the user may utilize to ask a new question. The question composition interface may include fields for the question title and the body of the question, and may further allow the user to select the question level, i.e., whether the question being asked is a novice/beginner question or an expert/advanced question.

Both individuals registered with system 100 as well as associations, companies, professional organizations, or other entities registered with system 100 may create profile pages within community module 180. Profile pages for business entities may include news and update postings from the entity, events in which the entity is involved, job postings offered by the entity, maps of the entity's office locations, links to the entity's website, feeds sourced from the entity's social media postings, and any other desired information. Users may subscribe to the profile pages of business entities, and subscriptions group 820 may include a list of and links to the business entity profile pages to which the user is subscribed. Subscriptions group 820 may further include a "mashup" button that the user may select to view a combined news feed of postings sourced from all business entity profile pages to which the user is subscribed. A search field included within subscriptions group 820 can allow the user to search through the profile pages that exist in the community to find and subscribe to a desired profile page.

Recommendations group 850 can include a list of business entity profile pages that may be of interest to the user. Community module 180 can determine which profile pages may be of interest to the user by employing various criteria. Such criteria may include, but are not limited to, the classes that the user is subscribed to, the user's professional, educational, and other affiliations, the user's interests, the profile pages to which the user is already subscribed, the user's geographic location, and any other desired criteria.

Community connections group 860 can include a list of other members of system 100 with whom the user has connections, and a list of other members of system 100 that subscribe to the same business entity profile pages as the user. Selecting any particular member listed in community connections group 860 can display the particular member's personal profile page. Messages group 830 can display a list of personal messages sent and received by the user, and can include links to the user's personal message inbox. User guide group 802 can provide guidance to the user as to the various features of community interaction module 180 and the associated dashboard and interfaces. News updates group 870 can include a news feed list of weblog and social media posts relevant to system 100 and its users.

Community interaction module dashboard 800 can further include additional links 880 that the user may select to view a corresponding aspect of community interaction module 180. Such links may include links to execute a search of community interaction module 180, and to view a list of questions asked by members of the community. Additionally, links may also be provided within corresponding information groups of community interaction module dashboard 800.

Figure 9A:
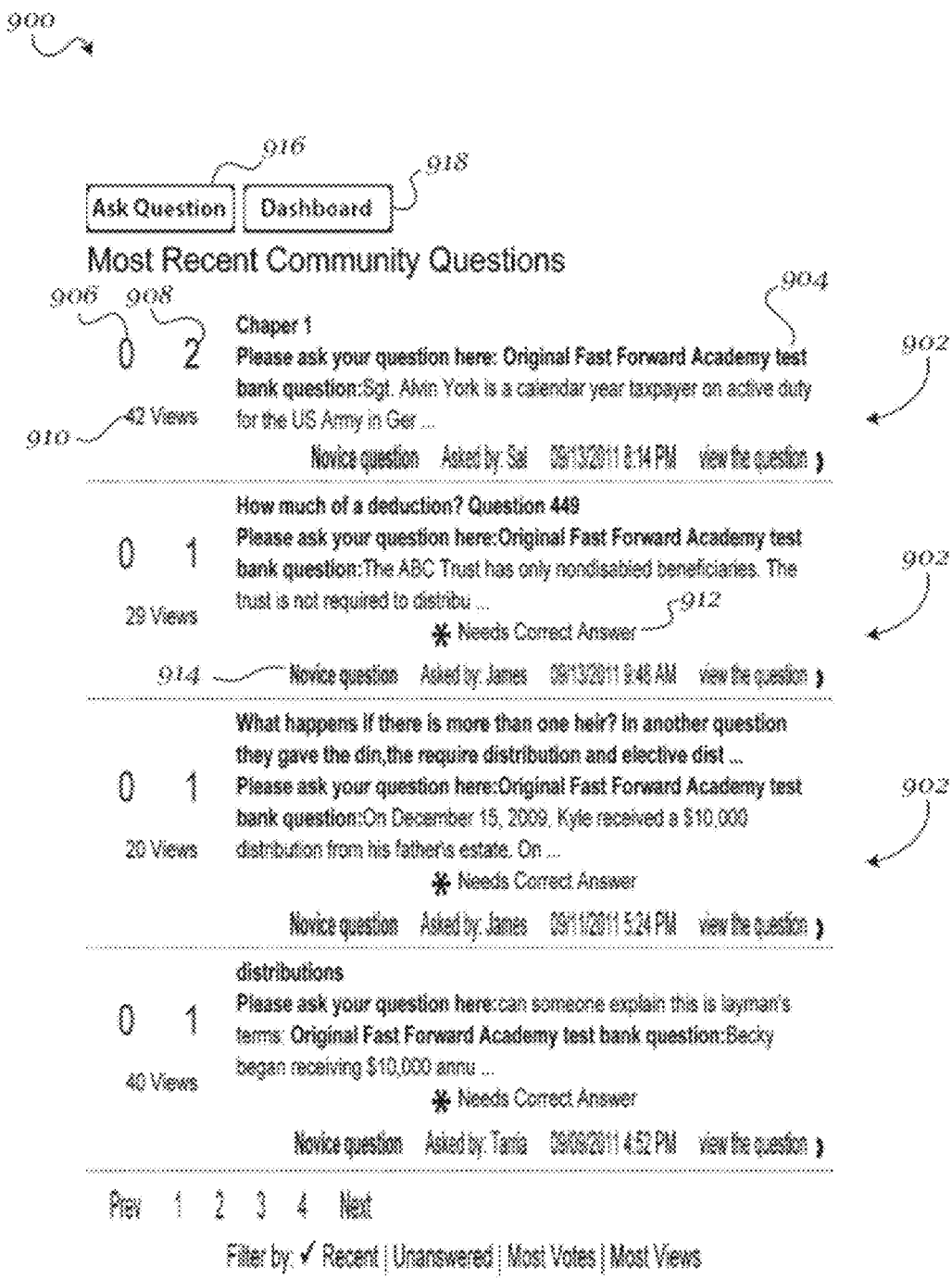
FIG. 9a shows an exemplary community question list interface.

Turning to FIG. 9a, an exemplary question list 900 may be shown. Question list 900 may display all questions asked by the community of which the user is a member, and may also be filtered so as to display the most recently asked questions, unanswered questions, the questions with most votes, the questions with most views, or may be filtered by any other desired criteria. Each question 902 displayed in question list 900 may include the question title and excerpt 904, a vote counter 906, an answer counter 908, a view counter 910, a correct answer indicator 912, and question metadata 914. Vote counter 906 may display the amount of votes that the question has received from members of the community, while answer counter 908 may display the amount of answers to the particular question that were given by members of the community. The view counter 910 may display the amount of times the particular question was viewed by members of the community. Correct answer indicator 912 may display whether a correct answer has been posted for the particular question. Question metadata 914 may include information pertaining to the particular question, such as question level, name of the member who asked the question, the date the question was asked, and any other desired information. The user may select any desired question displayed on the list to view the question interface for the particular question, may select ask question link 916 to ask a new question, or may select dashboard link 918 to return to community interaction module dashboard 800.

Figure 9B:
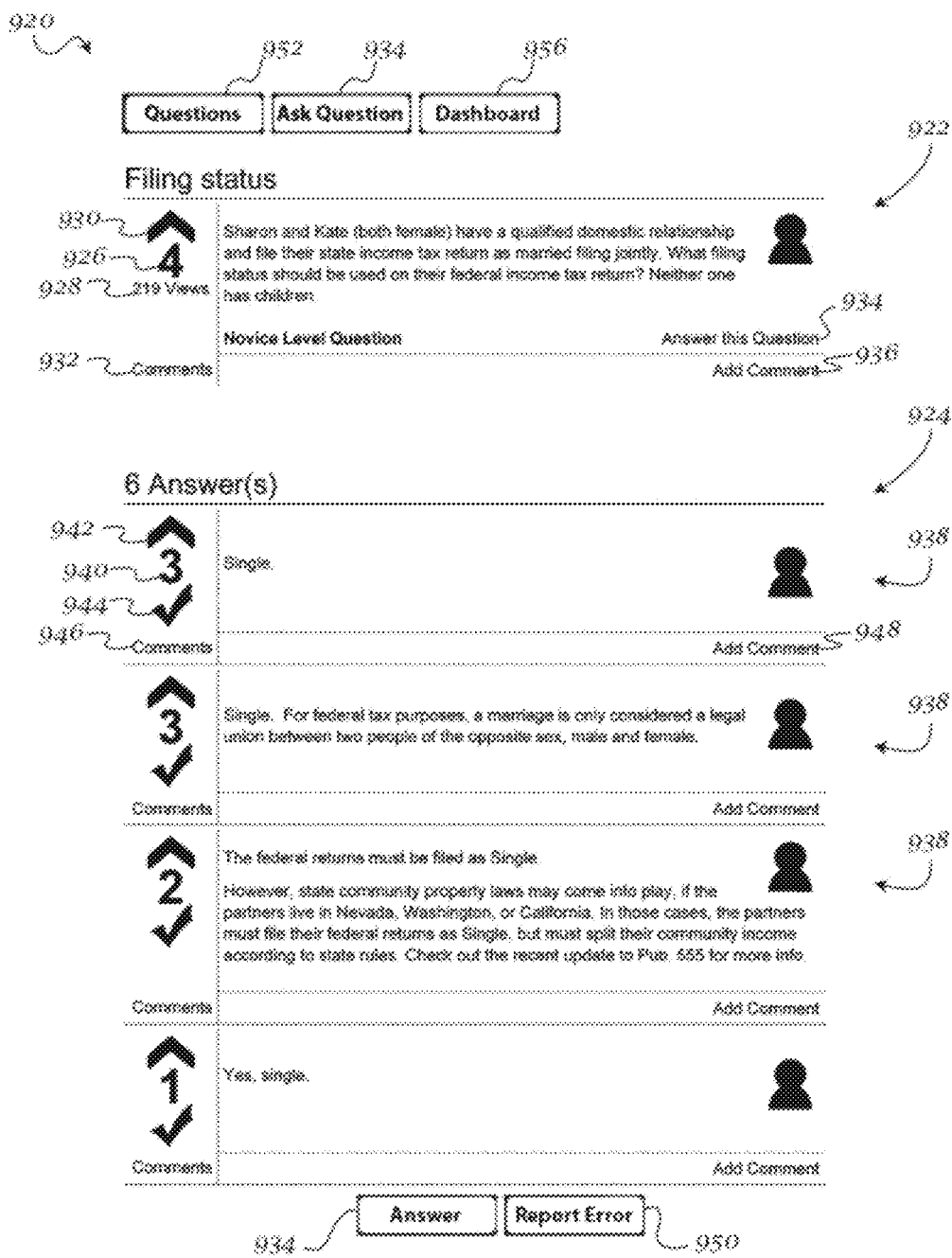
FIG. 9b shows an exemplary community question interface.

Turning to FIG. 9b, an exemplary question interface 920 may be displayed. Question interface 920 may include a question area 922 and an answer list 924. Question area 922 may include the title, text, and level of the question, vote counter 926, view counter 928, and vote button 930. Question area 922 may further include links to display comments related to the question 932, to answer the question 934 and to add a comment 936. Answer list 924 may display all answers 938 that were posted by members of the community. Each answer 938 may include the text of the answer, vote counter 940, vote button 942, correct button 944, and links to display comments related to the answer 946 and to add a comment 948. Question interface 920 may further include links to answer the question 934, report an error in a question or an answer 950, ask a new question 952, return to the list of questions 954, and return to the dashboard 956. A user may select vote buttons 930, 942 to increment the vote counters 926, 940 of any question or answer that the user finds to be informative. The user may also select correct button 944 to mark a particular answer as being the correct answer to the displayed question.

Turning to FIG. 9c, an exemplary user profile page 960 may be shown. Each member registered with system 100 may have a user profile page 960, and the user profile pages may be visible to other members of the community. User profile page 960 can include user information 962, credibility report 964, page list 966, and any other desired information pertaining to the particular member displayed on the user profile page. User information 962 may display information pertaining to the member and the member's reputation in the community, such as, for example, the date when the member registered with system 100, the location of the member, the credibility score of the member, the member's credentials and any other desired information. Page list 966 may display a list of the pages to which the particular member subscribes or contributes to. Additionally, links 968 can allow the user to form a connection with or send a private message to the particular member.

Credibility report 964 may display the member's credibility score, which may be a number within the range 0-100, or any other desired range. The credibility score may be calculated by consideration of the member's participatory activities in the community. Credibility report 964 can display which activities have been considered in calculating the credibility score. Such activities may include, but are not limited to, the creation of new pages, creation of page updates, subscribing to pages, making connections with other members of the community, creating questions, voting for questions, answering questions, voting for answers, writing correct answers, earning credentials, completing courses, frequency of participation in the community, and any other desired activities. Furthermore, the weight of each activity in calculating the credibility score may vary, and activities having greater weight may be identified in credibility report 964.

System 100 may further include shopping cart functionality for purchasing credits, courses, exams, or any other desired materials available through system 100. The shopping cart functionality can inform the user if particular materials have been previously purchased by the user.

System 100 can further include partner program capabilities, so as to reduce slippage and to give credit for the maximum amount of business sent to the implementer of system 100. The partner program capabilities can be effectuated regardless of whether an order placed with system 100 takes place via the internet, via telephone, or via any other medium. A non-expiring cookie may be set on a user's computing device when the user visits a web site of system 100. Upon the user's return, the implementer of system 100 can track and award commissions to any partners, for the life of the user's account. Additionally, a partner can be provided with a user-friendly tracking URL to access a web site of system 100, wherein the tracking URL can mask identifying data including, partner identification, referring site, and any other desired data. System 100 can use the identifying data to display co-branding relating to the partner, to create a cookie on the user's machine, and to creates session tracking variables, which can be transparent to the user. Upon registration of a user, the user is identified with the referring partner for the life of the user account. Subsequently, in the event the cookie is lost or the user comes back to the site without using the tracking URL, the account can remain assigned to the partner, and credit can be awarded to the partner at any time for any transaction occurring under the account.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer-implemented method for education including community-sourced data and community interactions, comprising:
    registering a plurality of users in a database;
    presenting educational material to a user of the plurality of users;
    recording the performance of the user in regards to the educational material;
    collecting personal statistics regarding the performance of the user;
    compiling the personal statistics for the plurality of users to generate community statistics regarding the performance of the plurality of users, wherein the personal statistics comprise the total amount of educational material completed by the user, the amount of educational material completed correctly by the user, the amount of educational material completed incorrectly by the user, and the time taken by the user to complete the educational material; and the community statistics comprise the total amount of educational material completed by the plurality of users, the amount of educational material completed correctly by the plurality of users, the amount of educational material completed incorrectly by the plurality of users, and the time taken by the plurality of users to complete the educational material;
    comparing the personal statistics of a user to the community statistics or to a subset thereof;
    collecting personal information from each user of the plurality of users;
    subdividing the plurality of users into a plurality of communities based on the personal information of each user;
    facilitating interactions between the users within a community of the plurality of communities;
    generating a credibility score for each user within the community, wherein the credibility score is calculated by consideration of the user's interactions in the community, the interactions comprising: creation of new pages, creation of page updates, subscribing to pages, making connections with other members of the community, creating questions, voting for questions, answering questions, voting for answers, writing correct answers, earning credentials, completing courses, positive feedback from other users, and frequency of participation in the community;
    allowing certain users to receive notifications of queries from other users in the community, and to modify educational content, wherein the certain users have a credibility score above a predetermined credibility score;
    generating a momentum score for the user based on the personal statistics; displaying the momentum score to the user; and
    dynamically adjusting the plurality of communities based on the activity of the plurality of users, the momentum scores of the plurality of users, and the credibility scores for the plurality of users, wherein a user is automatically associated with a relevant community.

2. The method of claim 1, wherein the participatory activities are weighted for the purpose of calculating the credibility score.

3. The method of claim 1, further comprising allowing certain users to modify educational content, wherein the certain users have a credibility score above a predetermined credibility score.

4. The method of claim 1, wherein facilitating interactions comprises:
    providing a community question interface;
    facilitating posting questions by users within the community;
    facilitating posting answers, by users within the community, to the posted questions; and
    facilitating voting, by users within the community, on the posted questions and posted answers.

5. The method of claim 1, wherein the educational material comprises one or more of continuing education courses and exams, practice exams, and study questions.

6. The method of claim 1, wherein the momentum score is a quotient of the amount of educational material completed correctly by the user and the total amount of educational material completed by the user.

7. The method of claim 1, further comprising:
    presenting the user with a dashboard interface, wherein the dashboard interface includes personal statistics, community statistics, and educational material.

8. A computer-implemented system for education including community-sourced data and community interactions, comprising:
    a plurality of user accounts;
    a plurality of educational modules;
    a community interaction module; and
    a database;
    at least one processor programmed with instructions such that the system is operable to register a plurality of users in a database, present educational material to a user of the plurality of users, record the performance of the user in regards to the educational material, collect personal statistics regarding the performance of the user, compile the personal statistics for the plurality of users to generate community statistics regarding the performance of the plurality of users, compare the personal statistics of a user to the community statistics or to a subset thereof, collect personal information from each user of the plurality of users, subdivide the plurality of users into a plurality of communities based on the personal information of each user, facilitate interactions between the users within a community of the plurality of communities, generate a credibility score for each user within the community, wherein the credibility score is calculated by consideration of the user's interactions in the community, the interactions comprising: creation of new pages, creation of page updates, subscribing to pages, making connections with other members of the community, creating questions, voting for questions, answering questions, voting for answers, writing correct answers, earning credentials, completing courses, positive feedback from other users, and frequency of participation in the community; and allow certain users to receive notifications of queries from other users in the community, and to modify educational content, wherein the certain users have a credibility score above a predetermined credibility score;

wherein the personal statistics comprise the total amount of educational material completed by the user, the amount of educational material completed correctly by the user, the amount of educational material completed incorrectly by the user, and the time taken by the user to complete the educational material; and the community statistics comprise the total amount of educational material completed by the plurality of users, the amount of educational material completed correctly by the plurality of users, the amount of educational material completed incorrectly by the plurality of users, and the time taken by the plurality of users to complete the educational material; and wherein the system is further operable to generate a momentum score for the user based on the personal statistics and display the momentum score to the user, and dynamically adjust the plurality of communities based on the activity of the plurality of users, the momentum scores of the plurality of users, and the credibility scores for the plurality of users, wherein a user is automatically associated with a relevant community.

9. The system of claim 8, wherein the participatory activities are weighted for the purpose of calculating the credibility score.

10. The system of claim 8, wherein the interactions between the users within the community comprise:
- posting questions by users of the community;
- posting answers, by users within the community, to the posted questions; and
- voting, by users within the community, on the posted questions and posted answers.

11. The system of claim 8, wherein the plurality of educational modules comprises a study question module, a practice exam module, and a continuing education module.

12. The system of claim 8, wherein each educational module of the plurality of educational modules comprises a dashboard interface.

13. The system of claim 12, wherein the dashboard interface comprises personal statistics, community statistics, and educational material.

14. The system of claim 8, wherein the momentum score is a quotient of the amount of educational material completed correctly by the user and the total amount of educational material completed by the user.

* * * * *